US011321261B1

(12) United States Patent
Schneider et al.

(10) Patent No.: US 11,321,261 B1
(45) Date of Patent: May 3, 2022

(54) DATA PROCESSING SYSTEMS AND METHODS FOR TRANSMITTING AND MODIFYING DATA VIA A SMART DATA CABLE

(71) Applicant: Copper Inc., Reno, NV (US)

(72) Inventors: Tobias Schneider, Reno, NV (US); Dickson Chu, Reno, NV (US)

(73) Assignee: Copper Inc., Reno, NV (US)

( * ) Notice: Subject to any disclaimer, the term of this patent is extended or adjusted under 35 U.S.C. 154(b) by 0 days.

(21) Appl. No.: 17/313,200

(22) Filed: May 6, 2021

Related U.S. Application Data

(60) Provisional application No. 63/132,895, filed on Dec. 31, 2020, provisional application No. 63/123,554, filed on Dec. 10, 2020.

(51) Int. Cl.
*G06F 13/38* (2006.01)
*G06F 13/40* (2006.01)
*G06F 13/42* (2006.01)

(52) U.S. Cl.
CPC .......... *G06F 13/385* (2013.01); *G06F 13/409* (2013.01); *G06F 13/4072* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 5,818,426 A | * | 10/1998 | Tierney | A63F 13/02 345/161 |
| 6,438,146 B1 | * | 8/2002 | Brafford | G06F 9/544 370/468 |
| 6,801,975 B1 | * | 10/2004 | Young | G06F 13/28 710/305 |
| 7,648,067 B2 | | 1/2010 | Nobutani | |
| 8,548,859 B2 | | 10/2013 | Matkovic | |
| 8,626,593 B2 | | 1/2014 | Goldfinger et al. | |
| 8,713,338 B2 | | 4/2014 | Mobin et al. | |

(Continued)

FOREIGN PATENT DOCUMENTS

WO 2016055117 4/2016

OTHER PUBLICATIONS

International Preliminary Report on Patentability, dated Jan. 10, 2019, from corresponding International Application No. PCT/US2017/040288.

(Continued)

*Primary Examiner* — Henry Tsai
*Assistant Examiner* — Aurangzeb Hassan
(74) *Attorney, Agent, or Firm* — Brient IP Law, LLC

(57) ABSTRACT

Various embodiments are described herein that relate to data transmission system and methods that may be implemented in a system configured between a source device and a destination device. Data generated at the source device may be received at the data transmission system and processed to determine appropriate modifications. Modified data may then be transmitted to the destination device. In the event that the data transmission system is unable to process data, the system transmits the data directly to the recipient device to ensure continued operation of the source and destination devices. The data transmission system is capable of converting any form of signal into USB and/or UART signals for processing.

18 Claims, 15 Drawing Sheets

(56) References Cited

U.S. PATENT DOCUMENTS

| | | | |
|---|---|---|---|
| 9,208,481 B2 | 12/2015 | Arzumanyan et al. | |
| 9,892,434 B2 | 2/2018 | Maenpaa et al. | |
| 9,979,566 B2* | 5/2018 | Rothermel | H04L 1/1829 |
| 10,102,591 B2 | 10/2018 | McLaughlin et al. | |
| 2001/0012289 A1* | 8/2001 | Norman | H04J 3/1611 |
| | | | 370/360 |
| 2004/0225823 A1* | 11/2004 | Heynemann | G06F 13/4059 |
| | | | 710/310 |
| 2005/0027918 A1* | 2/2005 | Govindarajulu | H04W 76/11 |
| | | | 710/313 |
| 2005/0055663 A1* | 3/2005 | Nijdam | G06F 9/45504 |
| | | | 717/100 |
| 2005/0216802 A1* | 9/2005 | Warren | G01R 31/318536 |
| | | | 714/724 |
| 2006/0091203 A1 | 5/2006 | Bakker et al. | |
| 2007/0171937 A1* | 7/2007 | Boatright | H04L 12/437 |
| | | | 370/465 |
| 2011/0296215 A1* | 12/2011 | Mobin | G06F 1/3253 |
| | | | 713/323 |
| 2011/0307342 A1 | 12/2011 | Haji | |
| 2012/0033718 A1* | 2/2012 | Kauffman | H04B 1/3822 |
| | | | 375/222 |
| 2012/0316950 A1 | 12/2012 | Laporte et al. | |
| 2013/0112743 A1 | 5/2013 | Cavin et al. | |
| 2013/0317835 A1 | 11/2013 | Mathew | |
| 2014/0195359 A1 | 7/2014 | Schulz | |
| 2014/0247711 A1* | 9/2014 | Gantman | H04W 48/20 |
| | | | 370/221 |
| 2019/0173811 A1 | 6/2019 | Estrada et al. | |

OTHER PUBLICATIONS

International Search Report, dated Sep. 19, 2017, from corresponding International Application No. PCT/US2017/040288.

Office Action, dated Jan. 11, 2021, from corresponding U.S. Appl. No. 17/092,112.

Written Opinion, dated Sep. 19, 2017, from corresponding International Application No. PCT/US2017/040288.

Office Action, dated Sep. 17, 2021, from corresponding U.S. Appl. No. 17/313,231.

Notice of Allowance, dated Jun. 2, 2021, from corresponding U.S. Appl. No. 17/092,112.

Office Action, dated Jul. 6, 2021, from corresponding U.S. Appl. No. 17/313,202.

Restriction Requirement, dated Jul. 9, 2021, from corresponding U.S. Appl. No. 17/313,231.

Notice of Allowance, dated Jul. 22, 2021, from corresponding U.S. Appl. No. 17/313,202.

Office Action, dated Feb. 4, 2022, from corresponding U.S. Appl. No. 17/486,244.

Notice of Allowance, dated Mar. 22, 2022, from corresponding U.S. Appl. No. 17/486,244.

\* cited by examiner

DATA PROCESSING SYSTEMS AND METHODS FOR TRANSMITTING AND MODIFYING DATA VIA A SMART DATA CABLE

CROSS-REFERENCE TO RELATED APPLICATIONS

This application claims priority to U.S. Provisional Patent Application Ser. No. 63/132,895, filed Dec. 31, 2020, and to U.S. Provisional Patent Application Ser. No. 63/123,554, filed Dec. 10, 2020. The disclosures of each of these applications are hereby incorporated herein by reference in its entirety.

FIELD OF THE INVENTION

Various embodiments concern smart data cables that are connected to other devices or networks and, more specifically, smart data cables for point-of-sale systems that enable merchants to accept mobile payments from customers and augment point of sale data.

BACKGROUND

There are approximately hundreds of thousands of bars and restaurants in the United States generating billions in sales each year. With the prevalence of Internet, a large number of consumers have migrated at least a part of their conventional shopping (e.g., for consumer products) from traditional, physical shops into online stores. Henceforth, many consumers have begun moving away from conventional payment processes when completing transactions (e.g., online payment transactions). In light of this, a number of payment processing systems are now available for processing commercial transactions initiated or completed online (e.g., through websites and/or using mobile devices). However, many customers are unable to enjoy the same kind of convenience that they enjoy from shopping online when they visit these bars and restaurants in person because many bars and restaurants are unable to accept mobile payments because of their continued use of traditional POS equipment. While there are ongoing efforts to upgrade the traditional point-of-sale (POS) systems with "smart" POS systems, such as those that can receive mobile payments and/or send receipts electronically to customers, this process is expensive and time consuming in terms of equipment upgrades and employee education. It is well known that the food service industry has very slim profit margins, therefore many bars and restaurants are slow to invest in upgraded equipment and additional employee training. Many other types of brick-and-mortar businesses also continue to rely on traditional POS systems for a variety of reasons.

SUMMARY

A data transmission system, according to various embodiments, may be configured to modify data transmitted from a source device to a destination device, the data transmission system comprising: a first adapter comprising one or more first connectors and one or more first serial communications outputs, wherein the first adapter is configured to: receive a first signal comprising initial data from the source device at the one or more first connectors; and transmit a second signal comprising the initial data via the one or more serial communications outputs to a first multiplexer; the first multiplexer configured to: receive the second signal from the first adapter; determine whether to transmit the second signal to a second multiplexer; and at least partially in response to determining to transmit the second signal to the second multiplexer, transmit the second signal to the second multiplexer; the second multiplexer configured to: receive the second signal from the first multiplexer; transmit the second signal to a processing component; receive a third signal from the processing component; and transmit the third signal to a second adapter; the processing component comprising one or more processors, data storage, one or more first serial communications inputs, and one or more second serial communications outputs, wherein the processing component is configured to: receive the second signal from the second multiplexer at the one or more first serial communications inputs; extract the initial data from the second signal; determine one or more modifications of the initial data based at least in part on the initial data; generate modified data based at least in part on the one or more modifications; generate the third signal comprising the modified data; and transmit the third signal via the one or more second serial communications outputs to the second multiplexer; and the second adapter comprising one or more second connectors and one or more second serial communications inputs, wherein the second adapter is configured to: receive the third signal comprising the modified data from the second multiplexer at the one or more second serial communications inputs; and transmit a fourth signal comprising the modified data via the one or more second connectors to the destination device.

In particular embodiments, the modified data comprises the initial data, and the processing component is configured to generate the modified data by augmenting the initial data with additional data. In particular embodiments, the processing component is configured to generate the modified data by altering the initial data. In particular embodiments, none of the one or more first connectors of the first adapter are a universal asynchronous receiver-transmitter (UART) connector or a universal serial bus (USB) connector; each of the one or more first serial communications outputs is a UART output or a USB output; and the first adapter is further configured to convert the first signal to the second signal, wherein the second signal is one of a UART signal and a USB signal. In particular embodiments, the one or more first connectors of the first adapter comprise a universal serial bus (USB) connector; the first adapter is further configured to relay the first signal from the USB connector to one or more of the one or more serial communications outputs. In particular embodiments, the one or more first connectors of the first adapter comprise a first single universal serial bus (USB) connector; and the one or more second connectors of the second adapter comprise a second single USB connector. In particular embodiments, the one or more first connectors of the first adapter comprise a first single serial communications connector that is not a universal serial bus (USB) connector; and the one or more second connectors of the second adapter comprise a second single serial communications connector that is not a USB connector.

A method of operating a data transmission system, according to various embodiments, may include: receiving, at one or more first connectors of a first adapter, a first signal from a source device, the first signal comprising initial data; transmitting, from one or more serial communications outputs of the first adapter, a second signal to a first multiplexer, the second signal comprising the initial data; determining, by the first multiplexer, to transmit the second signal to one of: a second multiplexer for transmission to a processing component, wherein the processing component is configured to generate modified data based at least in part on the initial data; and a second adapter for transmission to a destination device; at least partially in response to determining to transmit the second signal to the second adapter for transmission to the destination device, transmitting the second signal from the first multiplexer to one or more serial communications inputs of the second adapter; receiving, at the one or more serial communications inputs of the second adapter, the second signal; transmitting, from one or more second connectors of the second adapter, a third signal to the destination device, the third signal comprising the initial data.

In particular embodiments, determining, by the first multiplexer, to transmit the second signal to one of the second multiplexer and the second adapter comprises: determining, at the first multiplexer, whether a detected level of power meets a threshold level of power; and at least partially in response to determining that the detected level of power does not meet the threshold level of power, determining to transmit the second signal to the second adapter for transmission to the destination device. In particular embodiments, determining, by the first multiplexer, to transmit the second signal to one of the second multiplexer and the second adapter comprises: determining, at the first multiplexer, whether a detected level of power meets a threshold level of power; and at least partially in response to determining that the detected level of power meets the threshold level of power, determining to transmit the second signal to the second multiplexer for transmission to the processing component. In particular embodiments, determining, by the first multiplexer, to transmit the second signal to one of the second multiplexer and the second adapter comprises receiving a signal from the processing component. In particular embodiments, the signal from the processing component comprises an instruction to transmit the second signal to the second multiplexer. In particular embodiments, the signal from the processing component comprises an instruction to transmit the second signal to the second adapter. In particular embodiments, the first signal is a first communications standard signal; the second signal is a second communications standard signal; the first communications standard is different than the second communications standard; and transmitting, from one or more serial communications outputs of the first adapter, the second signal to a first multiplexer comprises converting, at the first adapter, the first communications standard signal to the second communications standard signal.

A data transmission system configured to modify data transmitted from a source device to a destination device, according to various embodiments, may include: a first adapter comprising one or more first connectors and one or more first serial communications outputs, wherein the first adapter is configured to: receive a first signal comprising initial data from the source device at the one or more first connectors; and transmit a second signal comprising the initial data via the one or more serial communications outputs to a first multiplexer; the first multiplexer configured to: receive the second signal from the first adapter; determine to transmit the second signal to one of a second multiplexer and a second adapter; at least partially in response to determining to transmit the second signal to the second multiplexer, transmit the second signal to the second multiplexer; and at least partially in response to determining to transmit the second signal to the second adapter, transmit the second signal to the second adapter; the second multiplexer configured to: receive the second signal from the first multiplexer; transmit the second signal to a processing component; receive a third signal from the processing component; and transmit the third signal to the second adapter; the processing component comprising one or more processors, data storage, one or more first serial communications inputs, and one or more second serial communications outputs, wherein the processing component is configured to: receive the second signal from the second multiplexer at the one or more first serial communications inputs; extract the initial data from the second signal; determine one or more modifications of the initial data based at least in part on the initial data; generate modified data based at least in part on the one or more modifications; generate the third signal comprising the modified data; and transmit the third signal via the one or more second serial communications outputs to the second multiplexer; and the second adapter comprising one or more second connectors and one or more second serial communications inputs, wherein the first adapter is configured to: receive the third signal comprising the modified data from the second multiplexer at the one or more second serial communications inputs; receive the second signal comprising the initial data from the first multiplexer at the one or more second serial communications inputs; and transmit a fourth signal via the one or more second connectors to the destination device.

In particular embodiments, the modified data comprises the initial data; and the processing component is configured to generate the modified data by augmenting the initial data with additional data comprising one or more of a coupon and a quick response (QR) code. In particular embodiments, the processing component further comprises one or more wireless communications components. In particular embodiments, the processing component is configured to determine the one or more modifications of the initial data based at least in part on the initial data by: transmitting, via the one or more wireless communications components, at least a subset of the initial data to a remote system; receiving, via the one or more wireless communications components, responsive data from the remote system; and determining the one or more modifications of the initial data based at least in part on the responsive data. In particular embodiments, the one or more first connectors of the first adapter comprise a first single universal serial bus (USB) connector; and the one or more second connectors of the second adapter comprise a second single USB connector. In particular embodiments, the one or more first connectors of the first adapter comprise a first single serial communications connector that is not a universal serial bus (USB) connector; and the one or more second connectors of the second adapter comprise a second single serial communications connector that is not a USB connector. In particular embodiments, the first multiplexer and the second multiplexer are configured in a single multiplexer component.

A data transmission system configured to transmit data received from a source device to a remote system, according to various embodiments, may include: a first adapter comprising one or more first connectors and one or more first serial communications outputs, wherein the first adapter is configured to: receive a first signal comprising initial data from the source device at the one or more first connectors; and transmit a second signal comprising the initial data via the one or more serial communications outputs to a first multiplexer; the first multiplexer configured to: receive the second signal from the first adapter; determine whether to transmit the second signal to a second multiplexer; and at least partially in response to determining to transmit the second signal to the second multiplexer, transmit the second signal to the second multiplexer; the second multiplexer configured to: receive the second signal from the first multiplexer; and transmit the second signal to a processing component; and the processing component comprising one or more processors, data storage, and one or more first serial communications inputs, wherein the processing component is configured to: receive the second signal from the second multiplexer at the one or more first serial communications inputs; extract the initial data from the second signal; generate remote system data based at least in part on the initial data; generate a third signal comprising the remote system data; and transmit the third signal to one or more wireless communications components; and the one or more wireless communications components comprising one or more wireless communications antennas and one or more wireless communications processors, wherein the one or more wireless communications components are configured to: receive the third signal from the processing component; and transmit the third signal to one or more remote systems.

In particular embodiments, the data transmission system further comprises a second adapter comprising one or more second connectors and one or more second serial communications inputs; the processing component further comprises one or more second serial communications outputs; the processing component is further configured to transmit the third signal via the one or more second serial communications outputs to the second multiplexer; the second multiplexer is further configured to: receive the third signal from the processing component; and transmit the third signal to the second adapter; and the second adapter is configured to: receive the third signal comprising the remote system data from the second multiplexer at the one or more second serial communications inputs; and transmit a fourth signal comprising the remote system data via the one or more second connectors to a destination device. In particular embodiments, the processing component is configured to generate the remote system data by augmenting the initial data with additional data. In particular embodiments, the additional data comprises one or more identifiers; each of the one or more identifiers is associated with one or more respective pieces of the initial data; and one or more of the one or more remote systems is configured to store the initial data in a data structure based on the one or more identifiers. In particular embodiments, one or more of the one or more remote systems are configured to provide an application programming interface that provides access to the remote system data. In particular embodiments, one or more of the one or more remote systems are selected from a group consisting of: (a) a data archiving system; (b) a payment processing system; (c) a business management system; and (d) a consumer data collection system. In particular embodiments, the initial data comprises sales transaction data.

A method of operating a data transmission system, according to various embodiments, may include: receiving, at one or more first connectors of a first adapter, a first signal from a source device, wherein the first signal is directed to a printer, and wherein the first signal comprises initial data; transmitting, from one or more serial communications outputs of the first adapter, a second signal to a first multiplexer, the second signal comprising the initial data; determining, by the first multiplexer, to transmit the second signal to one of: a second multiplexer for transmission to a processing component, wherein the processing component is configured to generate modified data based at least in part on the initial data; and a second adapter for transmission to a destination device; at least partially in response to determining to transmit the second signal to the second multiplexer for transmission to the processing component, transmitting the second signal from the first multiplexer to the processing component; receiving, at the processing component, the second signal from the first multiplexer; extracting, at the processing component, the initial data from the second signal; generating, at the processing component, a request for payment data based at least in part on the initial data; transmitting, from the processing component via one or more wireless communications components, the request for payment data to a payment processing system; receiving, at the processing component via the one or more wireless communications components, payment data from the payment processing system; generating, at the processing component, a third signal based at least in part on the payment data; transmitting, from the processing component, the third signal to the second multiplexer; transmitting, from the second multiplexer, the third signal to one or more serial communications inputs of a second adapter; receiving, at the one or more serial communications inputs of the second adapter, the third signal; and transmitting, from one or more second connectors of the second adapter, a fourth signal to the printer, the fourth signal based at least in part on the third signal.

In particular embodiments, generating, at the processing component, the third signal based at least in part on the payment data comprises generating, at the processing component, a scannable code; and the third signal comprises the scannable code. In particular embodiments, the method further comprises transmitting, from the processing component via the one or more wireless communications components, the payment data to a remote system. In particular embodiments, transmitting the payment data to the remote system comprises: generating, at the processing component, remote system data associating the payment data with the initial data; and transmitting, from the processing component via the one or more wireless communications components, the remote system data to the remote system. In particular embodiments, the method further comprises generating, at the processing component, based at least in part on the initial data, remote system data; and transmitting, from the processing component via the one or more wireless communications components, the remote system data to a remote system. In particular embodiments, the initial data comprises transaction data. In particular embodiments, the third signal is further based at least in part on the initial data.

A method of operating a mobile payment system, according to various embodiments, may include: receiving, at a first data transmission system via a first adapter configured at the first data transmission system, a first signal from a source device, wherein the first signal is directed to a printer, and wherein the first signal comprises transaction data; generating, at the first data transmission system, a request for payment data based at least in part on the transaction data; transmitting, from the first data transmission system via one or more wireless communications components configured at the first data transmission system, the request for payment data to a payment processing system; receiving, at a second data transmission system via one or more wireless communications components configured at the second data transmission system, payment data from the payment processing system, wherein the second data transmission system is distinct from the first data transmission system, and wherein the payment data comprises a subset of the transaction data; generating, at the second data transmission system, a second signal based at least in part on the payment data; and transmitting, from the second data transmission system via a second adapter configured at the second data transmission system, the second signal to a destination device.

In particular embodiments, the source device is a point-of-sale device and the destination device is the printer. In particular embodiments, the method further comprises: generating, at the first data transmission system, one or more data structure identifiers for each of one or more pieces of the transaction data; generating, at the first data transmission system, remote system data based at least in part on the on the transaction data and the one or more data structure identifiers for each of the one or more pieces of the transaction data; and transmitting, from the first data transmission system via the one or more wireless communications components configured at the first data transmission system, the remote system data to a remote system. In particular embodiments, one or more of the one or more pieces of the transaction data comprise data indicating a geographical location associated with the transaction data. In particular embodiments, one or more of the one or more pieces of the transaction data comprise data indicating a quantity of a particular item associated with the transaction data. In particular embodiments, one or more of the one or more pieces of the transaction data is selected from a group consisting of: (a) a total sales amount; (b) an amount of sales tax; (c) a subset of the total sales amount associated with a particular type of item; (d) an employee associated with a transaction; and (e) a tip amount.

BRIEF DESCRIPTION OF THE DRAWINGS

Various objects, features, and characteristics will become apparent to those skilled in the art from a study of the Detailed Description in conjunction with the appended claims and drawings, all of which form a part of this specification. While the accompanying drawings include illustrations of various embodiments, the drawings are not intended to limit the claimed subject matter.

DETAILED DESCRIPTION

Overview

Figure 1:
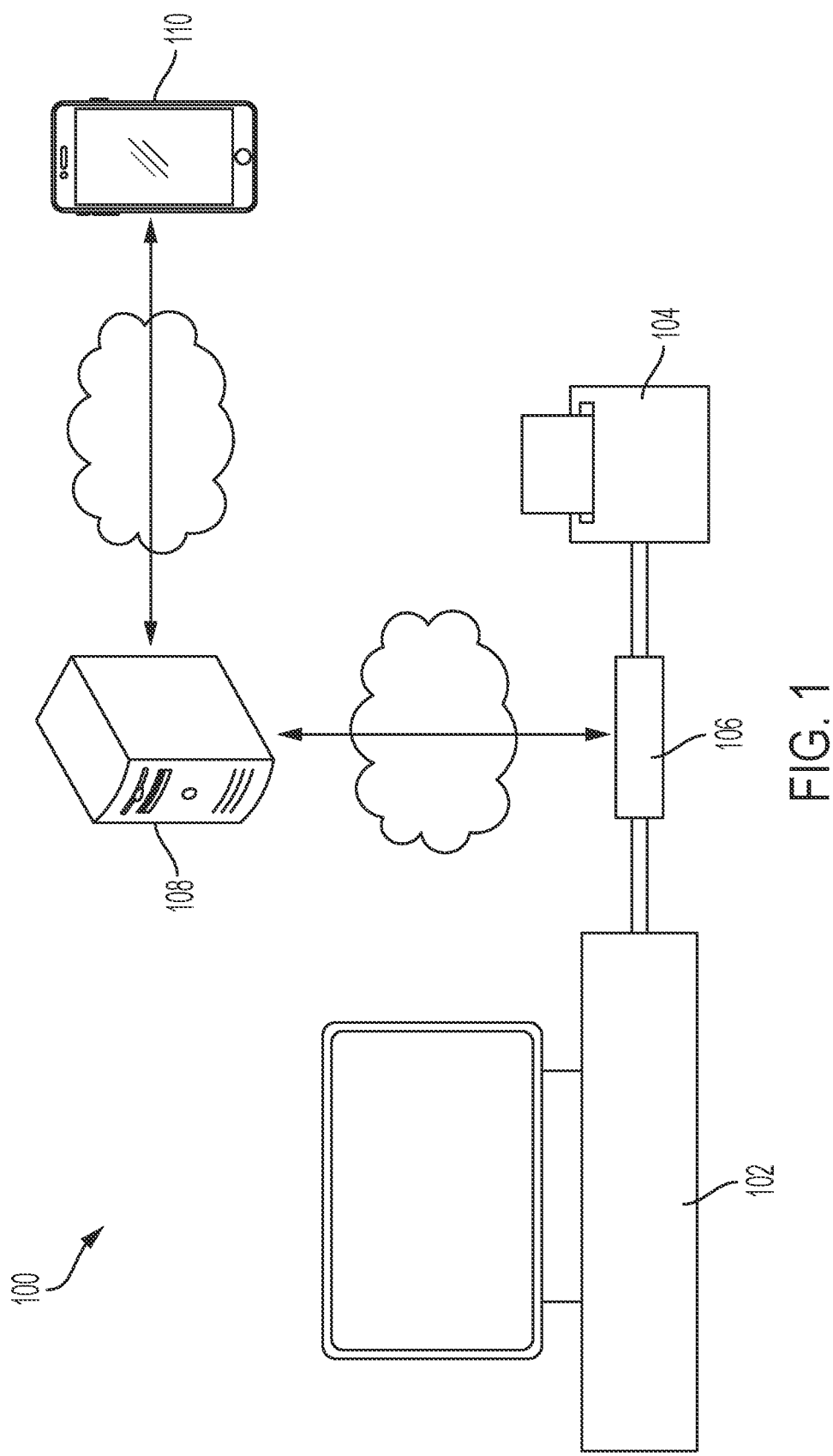
FIG. 1 is a generalized illustration of a network environment that includes a point-of-sale system connected to a receipt printer by a smart data cable and a network-accessible server.

Various embodiments are described herein that relate to data transmission systems and data cables configured with components that are connected to electronic devices and/or networks via one or more wireless protocols, such as Bluetooth, near field communication (NFC), Wi-Fi, 3G/4G/5G, etc. These "smart" data cables may be able to operate interactively and autonomously with the electronic devices to which the smart data cables are connected.

Various smart data cables described herein are designed to replace the existing data cable between a merchant's point of sale system and the receipt printer. When transaction data is transmitted to the receipt printer from the point-of-sale system, the smart data cable can copy certain elements from the transaction data (e.g., a respective description and price of each item ordered, as part of a particular transaction, at a restaurant or other business) and transmit the copied data to a remote computing system, such as a web server or cloud-based storage, for processing of various types. Such a technique may, for example, enable merchants to more readily accept mobile payments from customers and/or perform other activities involving remote systems using legacy equipment.

In various embodiments, the smart data cable may transmit item and/or pricing information from a customer's order at a restaurant, or other business, to a remote computing system that may allow the customer to pay for the order via a portable computing device associated with the customer (e.g., the customer's smartphone, tablet computing device, or laptop computer). In a particular embodiment, the smart data cable and/or remote computing system may facilitate this payment process by facilitating printing, on a paper receipt associated with the transaction, a unique computer-readable indicium (e.g., a bar code, such as a QR code, or an alphanumeric code) that is associated with the transaction. To pay for the order, the customer may use their portable computing device to scan the computer-readable indicia (e.g., QR code), which may facilitate payment for the order via the customer's portable computing device (e.g., via a suitable mobile payment service and/or digital wallet service such as Apple Pay, Google Pay, PayPal, or via a suitable payment card, such as a credit or debit card). In a particular embodiment, the QR code may be configured to, upon being scanned, direct a browser associated with the customer's portable computing device to an online payment gateway that may be used to facilitate payment for the order.

As discussed in greater detail below, having one or more smart cables transmit sales transaction data (e.g., a description and price of each item being sold as part of each transaction) to a remote server may be advantageous in ways other than facilitating payment for the transaction. For example, as discussed in greater detail below, this functionality may allow transaction data for one or more businesses to be stored in a searchable data structure for later access. This data may then be accessed (e.g., via a suitable API) for use in, for example: (1) documenting compliance with one or more laws, such as tax laws; (2) analyzing the sales transaction data for strategic purposes (e.g., determining, for a particular business for a particular time period, information regarding, for example: (a) gross sales; (b) how many new customers purchased items at the business; (c) the average tip left by customers in general or by a particular customer; (d) top items purchased by customers; and/or (e) top payment methods used by customers; (3) tracking customer behavior in one or more particular geographic areas (which may be used, for example, for purposes of targeted marketing, commercial real estate location assessments, and/or logistics (e.g., food delivery) analysis and planning; and/or (4) tracking and/or managing inventory (e.g., automatically reordering inventory based on data from the smart data cable(s) or using multiple different smart data cables in different locations to track the same item at each stage of a supply chain).

In various embodiments, a smart data cable may be configured between a POS device and a printer, as described in more detail herein (see, e.g., FIGS. 1, 2, 6, 10, and related descriptions). The POS device may transmit a signal containing data (e.g., transaction data) intended for the printer to the smart data cable. In response to receiving this signal, the smart data cable may process the received data and/or perform one or more other functions before, or instead of, providing the received data to the printer. For example, the smart data cable may modify the data received from the POS device by inserting additional data into the received data and/or changing the received data before transmitting the resultant data to the printer. Alternatively, or in addition, the smart data cable may transmit the received data and/or a modified version of the received data to one or more remote systems (e.g., for storage, payment processing, etc.) using one or more wireless communications components configured at the smart data cable. In particular examples, the smart data cable may also receive responsive data from such one or more remote systems that the smart data cable may use to generate data for the printer. The received responsive data may be data related to obtaining a payment for a transaction, such as data allowing the generation of a computer-readable indicia (such as a QR code or other bar code or other computer-readable indicia), interaction with a chat bot, etc. As noted above, using this received responsive data, the receipt generated by the printer may allow a customer to interact with a mobile payment system and provide payment for the transaction associated with the data that was received from the POS device at the smart data cable.

Figure 10:
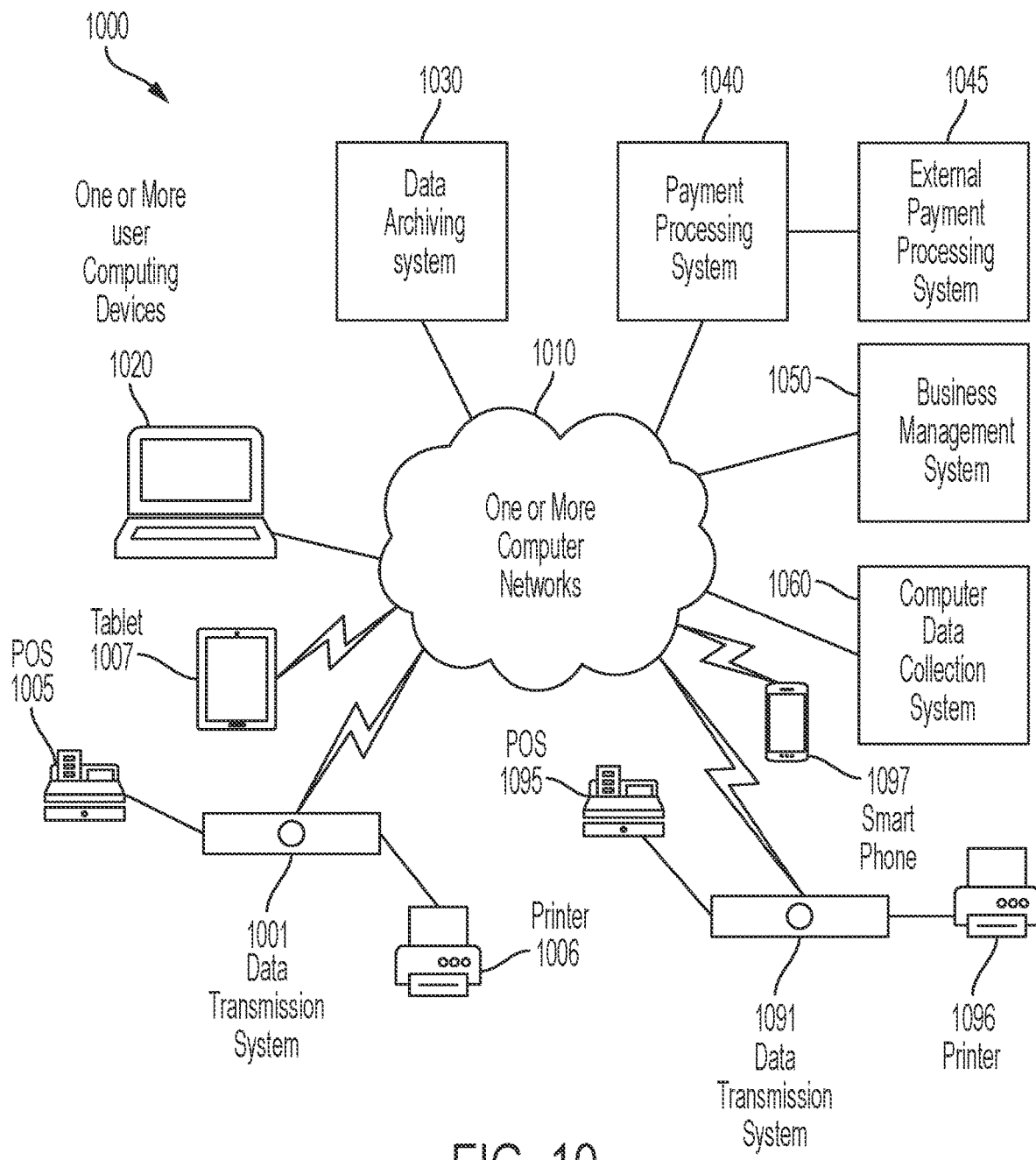
FIG. 10 is a block diagram of an exemplary system that may facilitate the interoperation of one or more data transmission systems and one or more remote systems.
Figure 11:
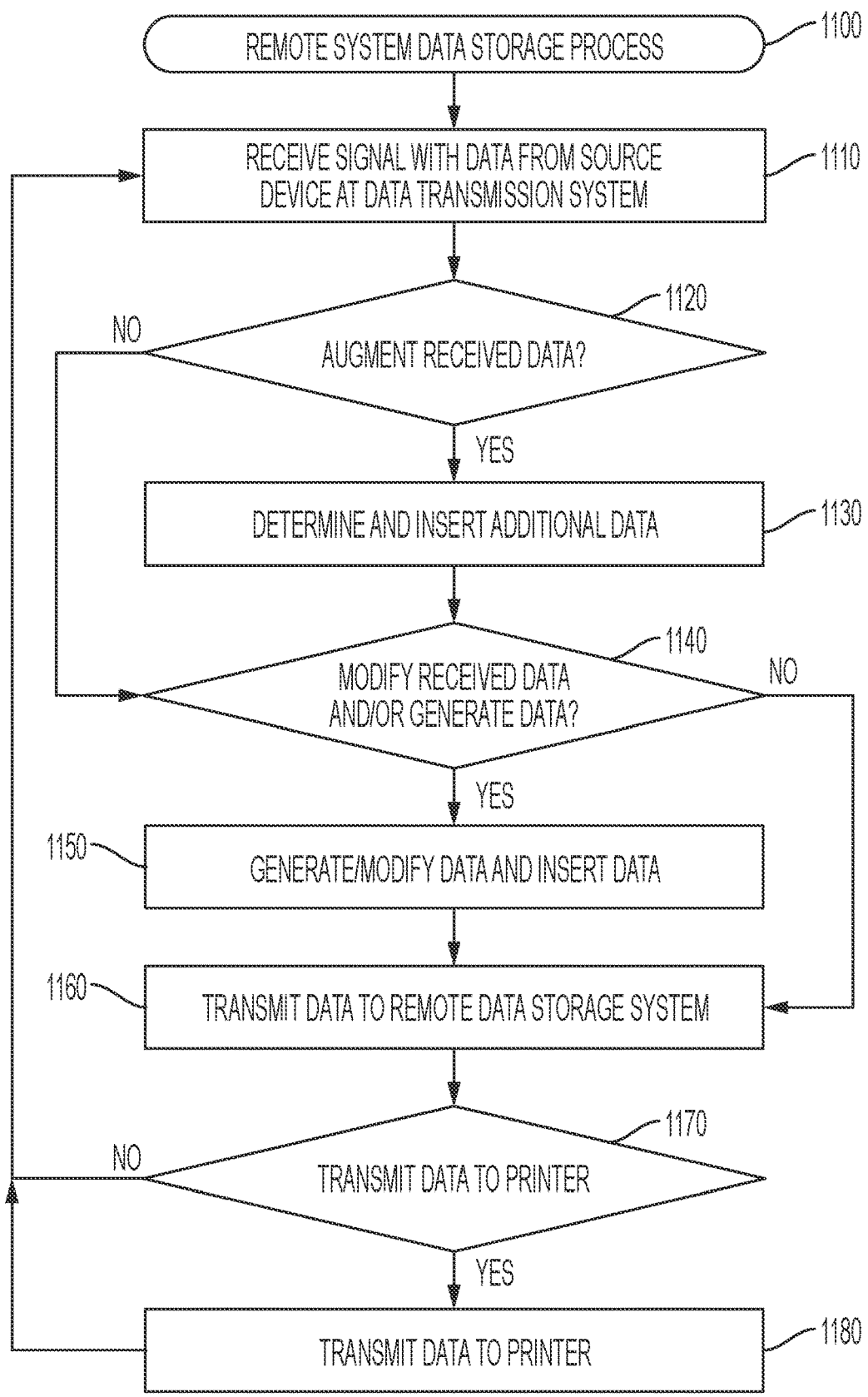
FIG. 11 is a block diagram of an exemplary process for remote data storage according to various embodiments.
Figure 12:
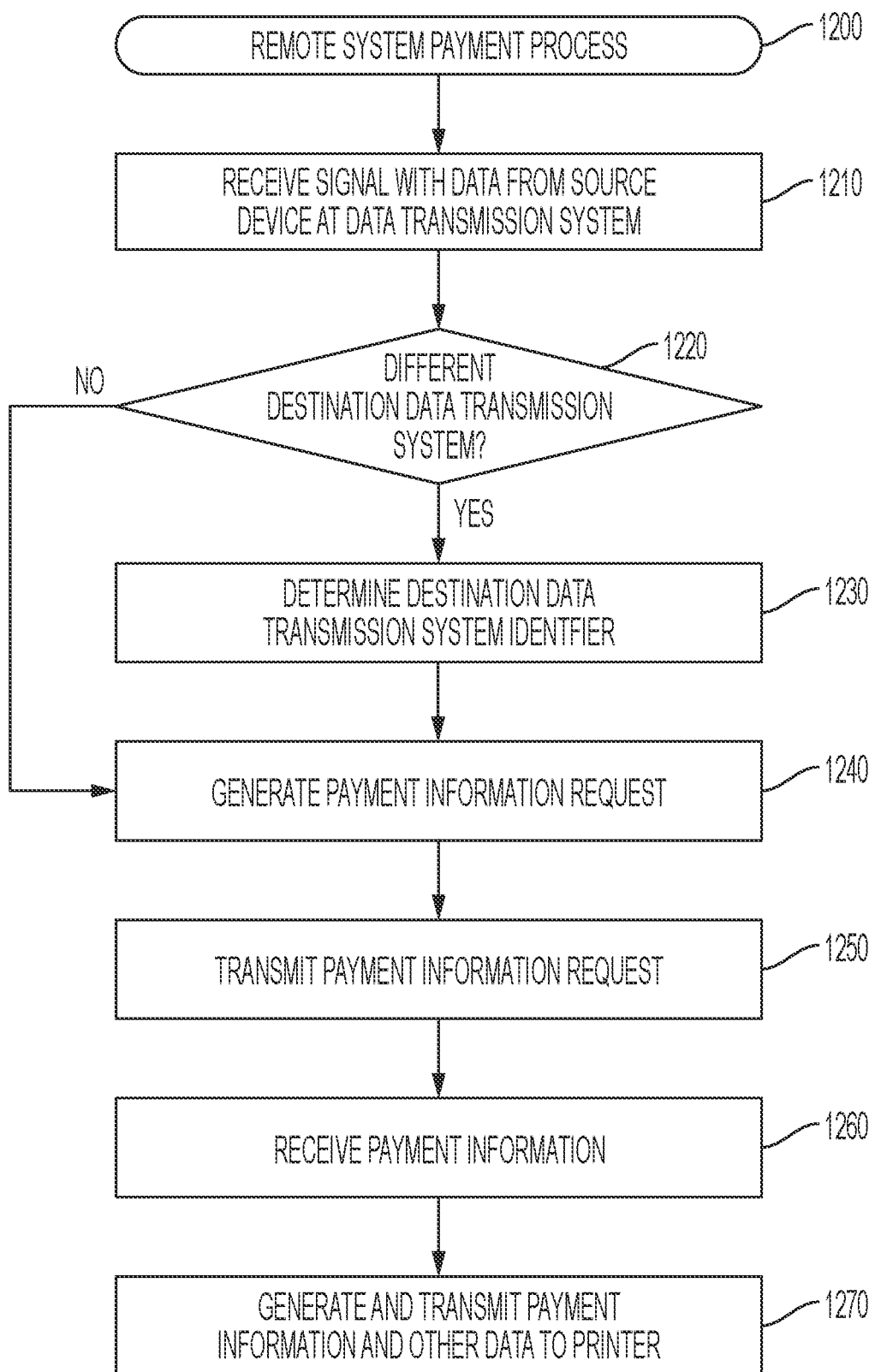
FIG. 12 is a block diagram of an exemplary process for facilitating payment using a remote system according to various embodiments.

In various embodiments, a smart data cable may interact with a remote system and/or another smart data cable to facilitate communications between physically separate locations as described in more detail herein (see, e.g., FIGS. 10, 11, 12, and related descriptions). For example, there are currently many businesses, such as food delivery businesses, that take orders for items at a first location but fulfill such orders at a second location that is physically distinct from the first location (e.g., at a ghost kitchen). In particular embodiments, an order for various items may be received at a first location configured with a POS device and a smart data cable. The POS device may transmit order data to the first location's smart data cable, which may then determine an appropriate remote system (e.g., an order processing system and/or another smart data cable) to which to transmit the order data. The first location's smart data cable can then transmit the order data to the appropriate destination system for processing using one or more wireless communications components, thus allowing the order to be fulfilled at a different location. In particular embodiments, one or more remote systems that receive order data from a first smart data cable at a first location may transmit the order data (with or without modification) to a second smart data cable located at a second location (e.g., for transmission to a printer or other device at the second location). Such one or more remote systems may determine the appropriate destination location and smart data cable based on the order or data and/or other criteria.

Such one or more remote systems that communicate with one or more smart data cable systems as described herein may perform a variety of processing and/or other functions that can greatly enhance the capabilities of legacy equipment. For example, and as described in more detail herein, a remote system may receive transaction data from a smart data cable and interact with a payment processing system to obtain payment information that the remote system may then provide to the smart data cable (or another smart data cable or other system) to facilitate receiving payment from a customer. In other examples, a remote system may receive data from a smart data cable that allows the remote system to perform, or otherwise facilitate (e.g., by transmitting to another system), business-related processing that may not be related to receiving payments, such as the processing of sales data, shift data, consumer data, inventory data, etc. These and other exemplary embodiments are described in more detail below.

Mobile Payments via Chat Bot

In various embodiments, a messaging application may be used to facilitate mobile payments. For example, when the receipt is brought to a customer, the customer may open a messaging application executing on the customer's user device (e.g., a mobile phone, tablet, or laptop). The customer can then initiate a chat with a chat bot supported by the web server. More specifically, the customer can take a picture of the receipt and post the picture to the chat. After the chat bot receives the picture of the receipt, various recognition (e.g., optical character recognition) techniques can be performed so that basic information can be extracted from the picture of the receipt. The web server then compares the basic information extracted from the picture of the receipt to the elements of transaction data copied by the smart data cable. Alternatively, the smart data cable may inject a QR code into the printer data that the customer can scan to be taken to the web server that supports the chat bot. The QR code may include transaction identification data that the web server can use to identify the transaction.

Once a match has been found, the chat bot has access to sufficient information (e.g., the amount due and restaurant name) to allow the user to pay for the receipt through a conversational interface presented by the user device. For example, if the receipt is private (i.e., for a single customer), the chat bot may ask for the customer's credit card information or for confirmation of the payment amount, tip, etc., if the customer has previously conducted transactions using the chat bot. However, if the receipt is shared (i.e., for multiple customers), the chat bot may ask how the receipt should be split between the multiple customers. Once the payment information is received from the customer(s), the server supporting the chat bot may interact with a payment processing system to complete the transaction. The server supporting the chat bot may also, or instead, interact with one or more other systems as described herein to perform other types of processing (e.g., data archiving, business management, consumer data collection, etc.).

Responsive to processing the transaction, the chat bot can send confirmation to the customer(s), the merchant, or both. For example, the chat bot may respond to the customer(s) directly (i.e., within the conversational interface) by sending a message that states, "Transaction completed. You're all set!" The merchant, meanwhile, can be notified via a message (e.g., a chat message delivered to an individual associated with the merchant, such as a manager) or by sending a notification to the smart data cable that causes a confirmation to be printed by the receipt printer.

The embodiments described herein provide numerous, technical advantages over existing mobile payment solutions. For instance, setup fees may be minimal or non-existent because the smart data cables interface with the merchant's existing infrastructure (e.g., point of sale device). Moreover, the chat bot may be available on a variety of messaging platforms and other payment apps that are generally available to mobile devices can be used with the disclosed embodiments, which ensures that consumers need not download an additional messaging or payment application that is developed solely for completing particular types of transactions. Other benefits of using a smart data cable include business incentives (e.g., more streamlined transaction experiences for both customers and merchants) and customer relation incentives (e.g., direct customer communication and feedback may be receivable through the chat channel managed by the chat bot).

Various embodiments may be described with reference to particular system configurations (e.g., point of sale systems for restaurants) and networks. However, one skilled in the art will recognize that features described herein are equally applicable to other system configurations, network types, merchant types, etc. Moreover, the techniques introduced herein can be embodied as special-purpose hardware (e.g., circuitry), programmable circuitry appropriately programmed with software and/or firmware, or as a combination of special-purpose and programmable circuitry. Hence, embodiments may include a machine-readable medium having stored thereon instructions which may be used to program a computer (or some other computing device) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

System Topology Overview

FIG. 1 is a generalized illustration of a network environment 100 that includes a point-of-sale system 102 connected to a receipt printer 104 by a smart data cable 106 and a network-accessible server 108. Together, the smart data cable 106 and the server 108 enable customers to pay for goods and/or services provided by the merchant associated with the point-of-sale system 102 using a mobile messaging application 110, such as Facebook™ Messenger, SnapChat™, and WhatsApp™. The mobile messaging application 110 is executed by the operating system of a user device 110 associated with a customer.

The smart data cable 106 (also referred to as a "tapping device") is connected to the point-of-sale system 102 and the receipt printer 104, as well as the server 108. The smart data cable 106 may be communicatively coupled to these components via wired or wireless connections. For example, the smart data cable 106 can be physically connected to the point-of-sale system 102 and the receipt printer 104 (e.g., via USB or serial ports) and wirelessly connected to the server 108 (e.g., via the Internet). Accordingly, the smart data cable 106 can be connected to one or more local area networks (LANs), wide-area networks (WANs), metropolitan area networks (MANs), and/or the Internet. In some embodiments, the smart data cable 106 can include a single multiplexed hardware interface to be physically connected to the point-of-sale system 102 and the receipt printer 104. The single multiplexed hardware interface can support multiple cable-based connections (e.g., USB, serial, and/or parallel ports). Additionally, or alternatively, the smart data cable 106 can communicate with the point-of-sale system 102 and/or the receipt printer 104 via Bluetooth, NFC, etc. In particular embodiments, the smart data cable 106 may be fully integrated into the housing of the receipt printer 104 and/or may share one or more components of the receipt printer 104. In other particular embodiments, the smart data cable 106 may be fully integrated into the housing of the point-of-sale system 102 and/or may share one or more components of the point-of-sale system 102.

When a transaction is initiated at the point-of-sale system 102 (e.g., by hitting a "print check" button on the point-of-sale system 102), the point-of-sale system 102 creates transaction data. The transaction data can include a manifest of goods and/or services that are purchased, a payment amount, a merchant name, a time and date of the transaction, and/or any other suitable information that would appear on a transaction receipt for purposes of identifying the details of the transaction. The transaction data can then be transmitted from the point-of-sale system 102 to the receipt printer 104 via the smart data cable 106, which can capture certain elements of the transaction data and transmit those captured elements to the server 108. Such a technique enables the customer(s) to complete the transaction using a messaging service or application, rather than present a payment card to the merchant.

When transaction data is transmitted to the receipt printer 104 from the point-of-sale system 102, the smart data cable 106 can copy elements of the transaction data and transmits those elements to the server 108. For example, the smart data cable 106 may identify and copy information required to process the transaction, such as the payment amount and the credit card number (which may be used by the server 108 to identify the customer).

The server 108 can then process the transaction using the copied elements of transaction data. For example, the server 108 may browse user accounts and/or a database of transactions to determine whether the payment card was used in a previous transaction. If a match is found, the server 108 may prompt the customer to simply confirm the transaction (e.g., by sending the customer a message to be presented by the user device 110). However, if no match is found, the server 108 may request additional information from the customer. For example, the server 108 may support a communications application that asks the customer for the credit card number, CVV, etc. Such information can be used by the server 108 to process the transaction and create an account on behalf of the customer. The account may include personal or financial information that enables future transactions to be more quickly and easily processed. The server 108 may also, or instead, interact with a payment processing system to obtain payment for the transaction.

Responsive to processing the transaction, the server 108 can send a confirmation to the customer, the merchant, or both. For example, a chat bot may respond to the customer directly by sending a message via a mobile messaging application that states, "Transaction completed. You're all set!" The merchant can be notified via a message (e.g., a chat message delivered to an individual associated with the merchant, such as a manager) or by sending a notification to the smart data cable 106 that causes a confirmation to be printed by the receipt printer 104. One skilled in the art will recognize that the chat bot can also collectively or individually communicate with multiple customers involved in a single transaction.

Generally, the presence of the smart data cable 106 is entirely transparent to the point-of-sale system 102 and the receipt printer 104. That is, the smart data cable 106 may appear to be one or more connected devices from the perspective of the point-of-sale device 102. For instance, the smart data cable 106 could appear as multiple connected devices (e.g., a receipt printer and a card reader) from the perspective of the point-of-sale device 102. The receipt printer 104, meanwhile, typically does not recognize any devices upstream in the transaction flow and, thus, may not even acknowledge the presence of the smart data cable 106. Because the smart data cable 106 parses the transaction data to copy certain elements and then passes the unaltered transaction data downstream to the receipt printer 104, neither point of sale system 102 nor the receipt printer 104 may be aware of the smart data cable's presence. Moreover, the main functionality of the receipt printer 104 (e.g., reliably printing receipts) can be guaranteed at any point, regardless of the other functions enabled by the smart data cable 106. Thus, even if the smart data cable 106 fails (e.g., loses network connectivity), the merchant can continue to print receipts and complete payment transactions as would conventionally be done (e.g., by swiping a payment card at the point-of-sale device 102).

In some embodiments, the smart data cable 106 can share network services with other devices. For example, the smart data cable 106 could share Wi-Fi and/or Bluetooth connectivity with a customer's user device in order to allow the customer to utilize mobile payment services facilitated by the smart data cable even if the customer's user device is not otherwise connected to a network (e.g., no cell service is available). The smart data cable 106 could also share network services with the point-of-sale device 102 and/or the receipt printer 104.

While the user device 110 is depicted as a mobile phone, one skilled in the art will recognize that other electronics can also be used. For instance, the user device 110 can be (or be facilitated by) a tablet, laptop, personal computer, network-connected ("smart") television, game console (e.g., Sony PlayStation™ or Microsoft Xbox' game console), network-connected mobile gaming device (e.g., Sony PSP'), television-connected device (e.g., Roku™, Apple Google Chromecast™, Amazon FireStick™, Android TV™, Blu-ray disc players), another network-accessible device having an interface (e.g., Apple iPod Touch™, Apple Watch™), etc.

Figure 2:
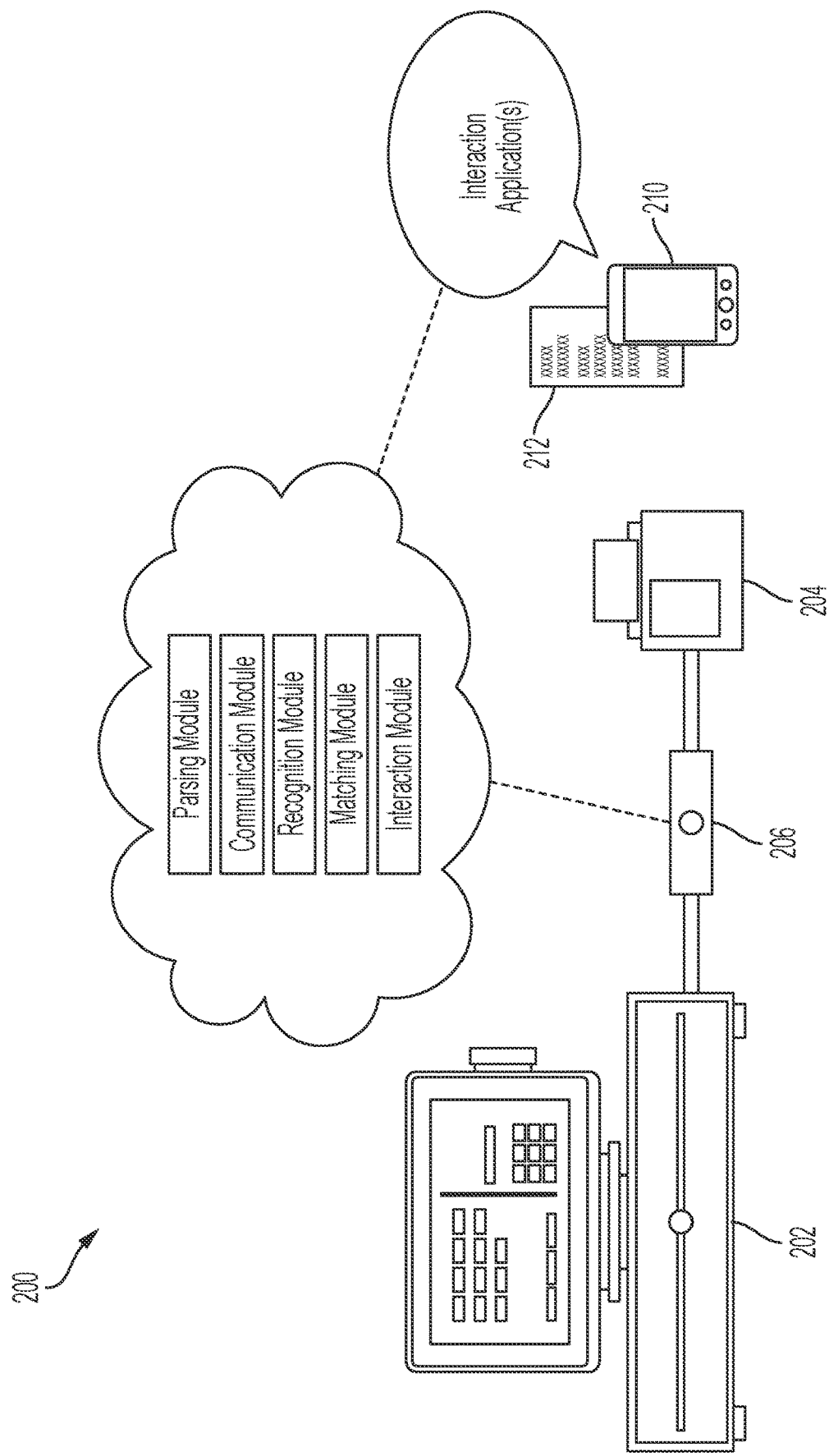
FIG. 2 is another generalized illustration of a network environment that includes a point-of-sale system connected to a receipt printer by a smart data cable.

FIG. 2 is another generalized illustration of a network environment 200 that includes a point-of-sale system 202 connected to a receipt printer 204 by a smart data cable 206. The smart data cable 206 can be seamlessly integrated into the merchant's point of sale environment by replacing a pre-existing cable that extends between the point-of-sale system 202 and the receipt printer 204. Note, however, that in some embodiments the smart data cable 206 communicates with the point-of-sale system 202 and/or the receipt printer 204 via wireless connections and, thus, need not be physically connected to such components. In such embodiments, the smart data cable 206 may include a wireless communication module that enables communication via Bluetooth, NFC, etc.

The smart data cable 206 typically receives power from either the point-of-sale system 202 or the receipt printer 204. However, in some embodiments (e.g., where the smart data cable 206 is wirelessly coupled to both components), the smart data cable 206 may have a physical power interface, such as a plug or jack.

As shown here, the smart data cable 206 may be able to connect to point-of-sale systems and printers of different types, having different operating systems, etc. Moreover, the smart data cable 206 may be able to parse or otherwise process transaction data transmitted from the point-of-sale system 202 to the receipt printer 204 regardless of format and copy elements of the transaction data needed to process the transaction. The copied elements can be transmitted to a cloud-based platform that processes transactions between customers and merchants. Alternatively, the smart data cable 206 may relay the transaction data, in whole or in part, to a platform or other remote system for processing without performing parsing of such data. The cloud-based platform may be responsible for supporting one or more systems that facilitate communication with one or more customers using a messaging service (e.g., email) or a messaging application (e.g., Facebook™ Messenger, SnapChat™, WhatsApp™, Slack™, Hipchat™ and enable the one or more customers to pay for goods and/or services provided by a merchant using a conversational interface presented by the user device 210 (e.g., using one or more interaction applications).

More specifically, when the receipt 212 is brought to a customer, the customer may open an interaction application, such as a messaging application, executing on the customer's user device 210 (e.g., a mobile phone, tablet, or laptop). The customer can then initiate a communication interaction, such as a chat with a chat bot, that may be managed by the cloud-based platform. For example, the customer can take a picture of the receipt 212 and post the picture to the chat or otherwise upload the picture using the interaction application. After the picture of the receipt is received (e.g., at the cloud-based platform), various recognition (e.g., optical character recognition) techniques can be performed so that basic information can be extracted from the picture of the receipt 212. The cloud-based platform can then compare the basic information extracted from the picture of the receipt 210 to the elements of transaction data copied by the smart data cable 206. The messaging application and/or any other interaction application as described herein may be accessible through some combination of a web browser, software program, mobile application, and over-the-top (OTT) application.

Once a match has been found, the interaction application may have access to sufficient information (e.g., the amount due and restaurant name) to allow the customer to pay for the receipt through a conversational interface presented by the user device 210. For example, if the receipt is private (i.e., for a single customer), the application may ask for the customer's credit card information or for confirmation of the payment amount, tip, etc. However, if the receipt is shared (i.e., for multiple customers), the application may ask how the receipt should be split between the multiple customers.

Responsive to processing the transaction, the application can send a confirmation to the customer(s), the merchant, or both. For example, the application may respond to each customer directly (i.e., within the conversational interface) by sending a message that states, "Transaction completed. You're all set!" The merchant, meanwhile, can be notified via a message delivered to an employee or by sending a notification to the smart data cable 206 that causes a confirmation to be printed by the receipt printer 204.

Figure 3:
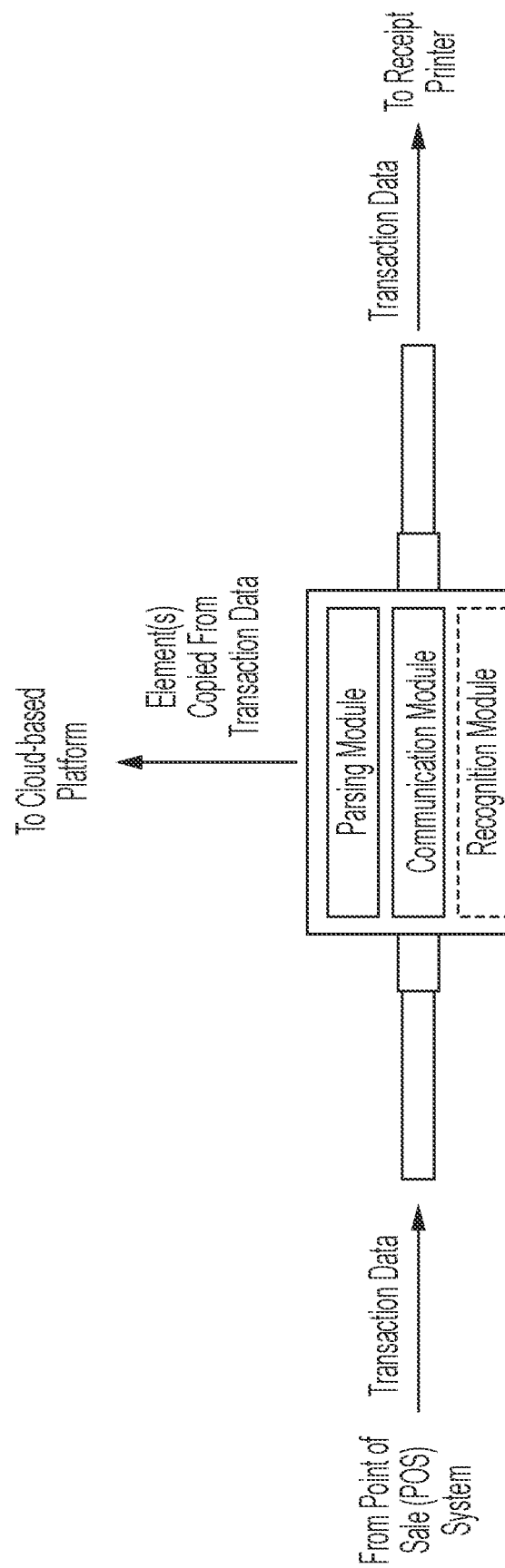
FIG. 3 depicts how a smart data cable processes data passed between a point-of-sale system and a receipt printer.

FIG. 3 depicts how a smart data cable parses data passed between a point-of-sale system and a receipt printer. The smart data cable can include a parsing module for processing data received from the point-of-sale system and a communication module for establishing a (secure) communication link with a network-accessible server. In some embodiments, the smart data cable also includes a recognition module that performs one or more recognition techniques on data received by the cable (e.g., from the point-of-sale system or from the network-accessible server).

As transaction data is passed from the point-of-sale system to the receipt printer, the transaction data can be parsed by the smart data cable. The smart data cable may copy certain element(s) required to process the transaction. Because the elements represent copies of the transaction data, the transaction data can be passed to the receipt printer unaltered. The copied elements can include a manifest of goods and/or services that are purchased, a payment amount, a merchant name, a time and date of the transaction, and/or any other suitable information that would appear on a transaction receipt for purposes of identifying the details of the transaction.

As noted above, the cloud-based platform can use the element(s) copied from the transaction data to process a transaction completed by the customer using a mobile messaging application. In some embodiments, the copied element(s) can be used by the cloud-based platform as confirmation that information specified by the customer through one or more messages is correct.

Figure 4:
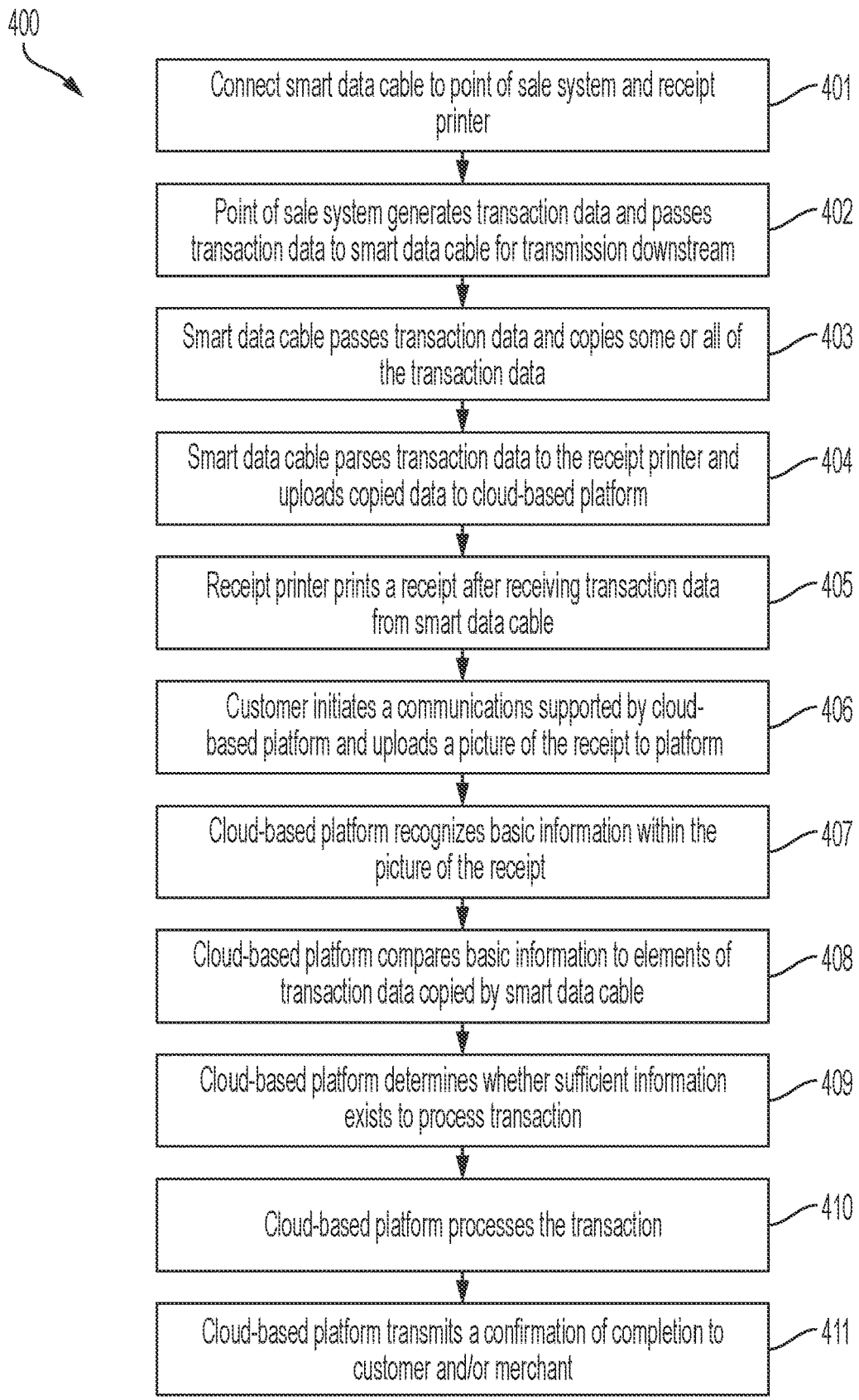
FIG. 4 depicts a flow diagram of a process for processing a transaction completed using a messaging application.

FIG. 4 depicts a flow diagram of a process 400 for processing a transaction completed using a messaging application. Initially, a smart data cable is connected to a point-of-sale system and a receipt printer (step 401). For example, the smart data cable can be physically (e.g., via USB or serial ports) or wirelessly (e.g., via Bluetooth or NFC) coupled to the point-of-sale system and the receipt printer.

When a transaction is initiated at the point-of-sale system, the point-of-sale system generates transaction data and passes the transaction data to the smart data cable for transmission downstream to the receipt printer (step 402). The transaction can be initiated responsive to the merchant selecting a "print check" button at the point-of-sale system. The smart data cable can then parse the transaction data and copy some or all of the transaction data (step 403). For example, the smart data cable may only copy the information needed to process the transaction (e.g., the amount to be paid and/or an itemized list of the goods and/or services purchased).

The smart data cable then passes the unmodified transaction data to the receipt printer and uploads the copied data to a cloud-based platform (step 404). This enables the cloud-based platform to assist in processing the transaction between the merchant and the customer. In some embodiments, the receipt printer prints a receipt after receiving the transaction data from the smart data cable (step 405).

When the receipt is brought to a customer, the customer may open a messaging application executing on the customer's user device (e.g., a mobile phone, tablet, or laptop). The customer can then initiate a communications session (e.g., a chat with a chat bot) supported by the cloud-based platform by uploading a picture of the receipt to the platform (step 406). As noted above, the cloud-based platform may communications using any messaging application capable of being executed by the customer's user device.

After the platform receives the picture of the receipt, various recognition (e.g., optical character recognition techniques) can be performed by the cloud-based platform so that basic information can be extracted from picture of the receipt (step 407). In some embodiments, the recognition techniques are instead performed by the user device and the basic information extracted from the picture of the receipt is uploaded to the cloud-based platform for review. The platform can then compare the basic information extracted from the picture of the receipt to the elements of transaction data copied by the smart data cable (step 408).

Once a match has been found, the cloud-based platform determines whether it has access to sufficient information (e.g., the amount due and the merchant name or identifier) to facilitate processing of the transaction (step 409). For example, if the cloud-based platform does not have sufficient information, the platform may ask for the customer's credit card information or CVV. However, if the cloud-based platform does have sufficient information, the platform may simply ask for confirmation of the payment amount, tip, etc. The cloud-based platform can process the transaction after retrieving or acquiring the necessary information (step 410).

Responsive to processing the transaction, the platform can send a confirmation to the customer, the merchant, or both (step 411). For example, the platform may respond to the customer directly (i.e., within the conversational interface) by sending a message that states, "Transaction completed. You're all set!" The merchant can be notified via a message (e.g., a chat message delivered to an individual associated with the merchant, such as a cashier or manager) or by sending a notification to the smart data cable that causes a confirmation to be printed by the receipt printer.

Unless contrary to physical possibility, it is envisioned that the steps described above may be performed in various sequences and combinations. For instance, the customer may post a picture of the receipt to the platform before the smart data cable has uploaded the copied elements of transaction data. Other steps can also be included in some embodiments.

Computer System

Figure 5:
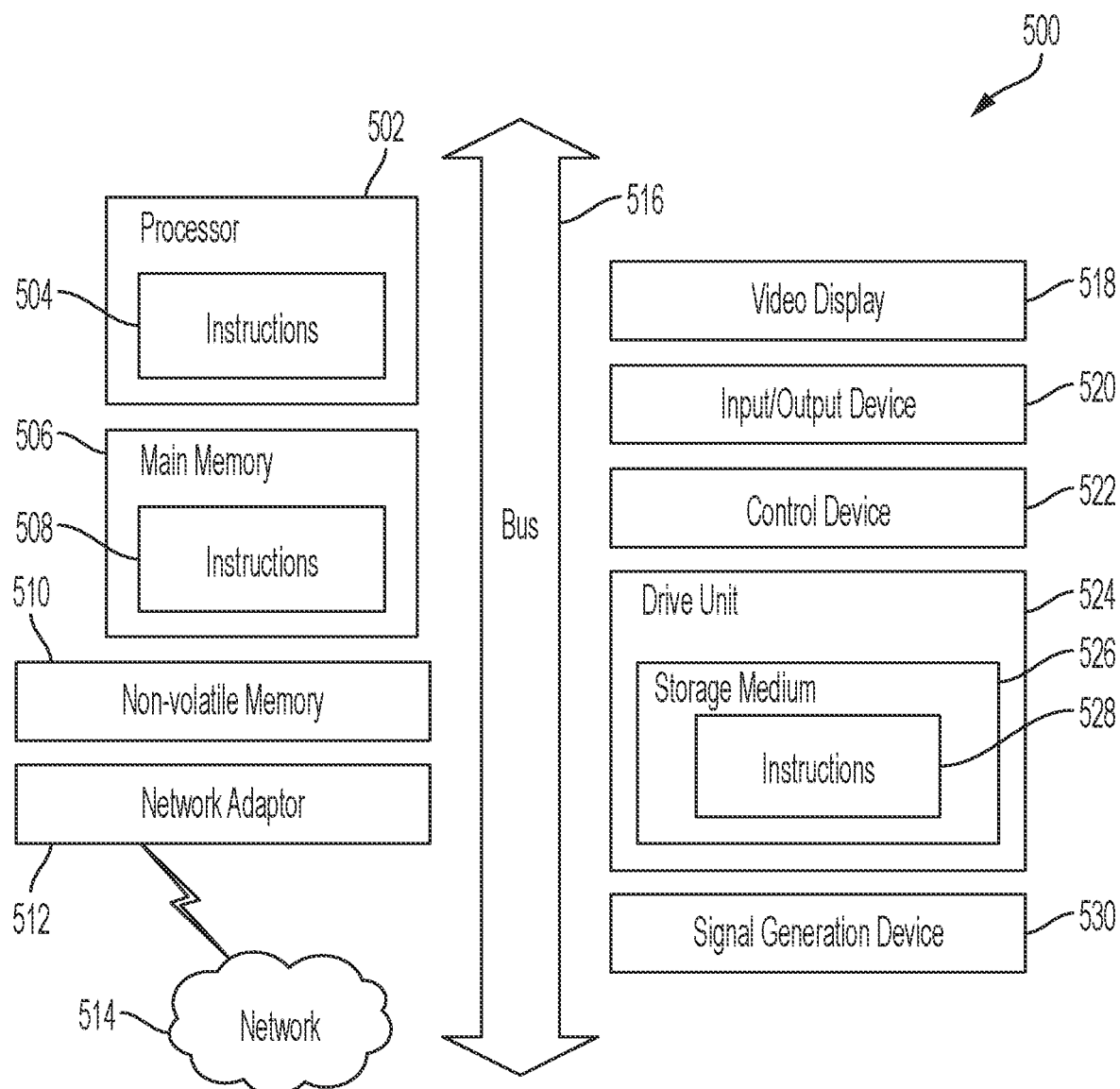
FIG. 5 is a block diagram illustrating an example of a computer system in which at least some operations described herein can be implemented.

FIG. 5 is a block diagram illustrating an example of a computing system 500 in which at least some operations described herein can be implemented. The computing system may include one or more central processing units ("processors") 502, main memory 506, non-volatile memory 510, network adapter 512 (e.g., network interfaces), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents any one or more separate physical buses, point to point connections, or both connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 500 operates as a standalone device, although the computing system 500 may be connected (e.g., wired or wirelessly) to other machines. In a networked deployment, the computing system 500 may operate in the capacity of a server or a client machine in a client-server network environment, or as a peer machine in a peer-to-peer (or distributed) network environment.

The computing system 500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the computing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 510, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 512 enables the computing system 500 to mediate data in a network 514 with an entity that is external to the computing device 500, through any known and/or convenient communications protocol supported by the computing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Data Transmission System Overview

Figure 6:
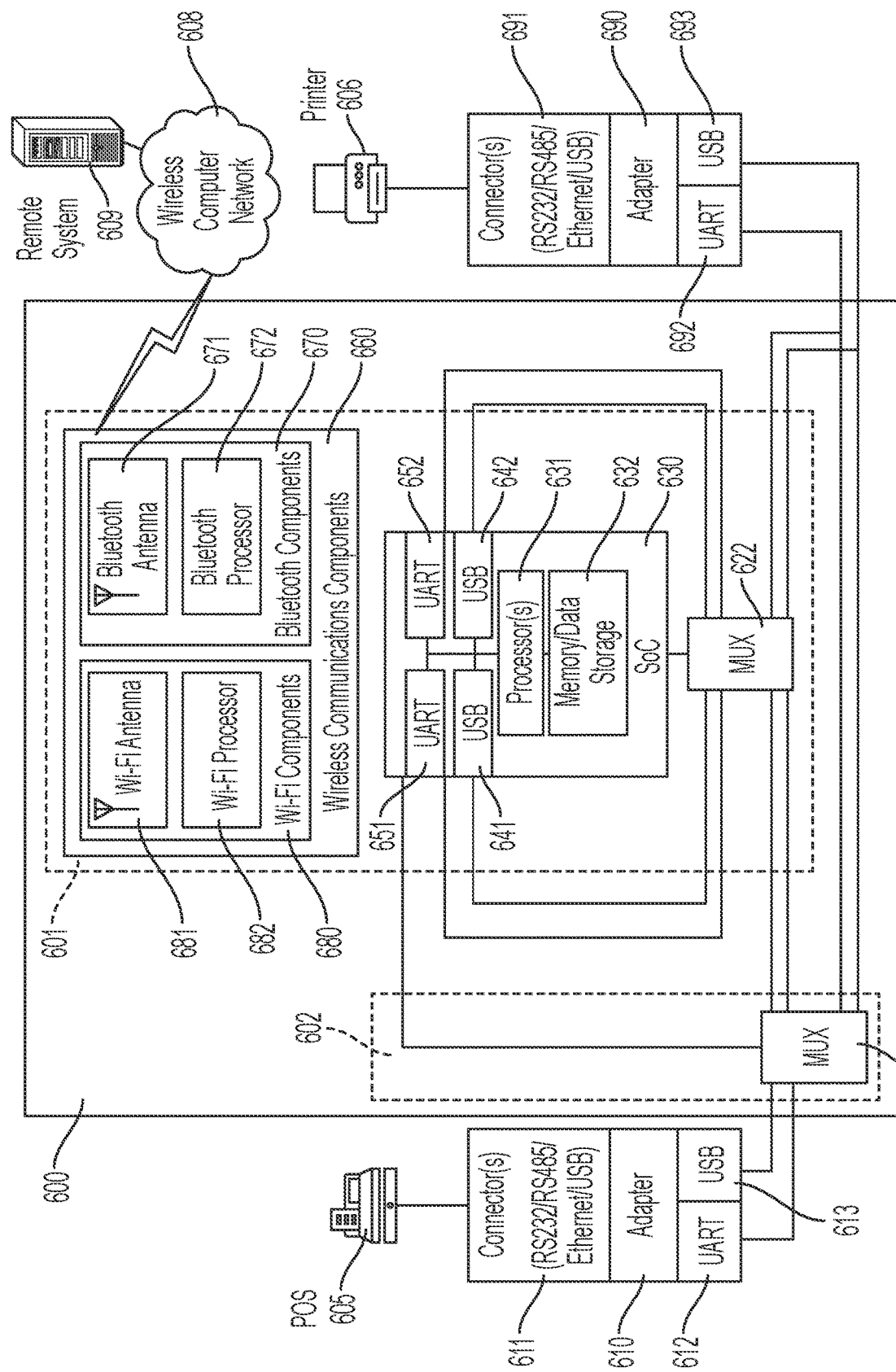
FIG. 6 is a block diagram illustrating an exemplary smart data cable system according to various embodiments.

FIG. 6 illustrates an exemplary data transmission system 600. In various embodiments, the data transmission system 600 may be implemented in a smart cable form factor (e.g., as described herein) such that the data transmission system 600 is attached to two or more devices in a manner similar to that of a standard cable, such as an ethernet cable, a USB cable, a serial cable (e.g., RS-232 cable, RS-435 cable, etc.), or any other cable that facilitates the exchange of electrical signals between two devices.

The data transmission system 600 may be configured between any one or more source devices and any one or more destination devices. In a particular embodiment, the data transmission system 600 may be configured between a point-of-sale device 605 and a printer 606. The POS device 605 may be any type of point-of-sale device, including a traditional point of sale device such as a credit card reader, credit card scanner, cash register, etc., and/or a computing device capable of performing other functions beyond point-of-sale functions, such as a smartphone, tablet, laptop computer, etc., that may be configured with point-of-sale functionality. The printer 606 may be any type of printer that may, for example, be connected to a point-of-sale device for printing receipts, shift reports, payment reports, etc.

The data transmission system 600 may be connected to the POS device 605 by an adapter 610 that may be configured with one or more connectors 611 and a universal asynchronous receiver-transmitter (UART) output 612 and/or a USB output 613. The one or more connectors 611 may include one or more connectors that each provide a physical interface for the transmission and/or reception of data using electrical signals. In particular embodiments, the one or more connectors 611 may include one or more standard physical interfaces such as an RS-232 interface, an RS-435 interface, any type of standard USB interface, any type of standard ethernet interface, any other type of standard serial interface, etc. The adapter 610 may convert the signal received at the one or more connectors 611 into a USB signal that is then provided to the data transmission system 600 via the USB output 613. Alternatively, or in addition, the adapter 610 may convert the signal received at the one or more connectors 611 into a UART signal that is then provided to the data transmission system 600 via the UART output 612. Alternatively, or in addition, in embodiments where such signal conversion is unnecessary (e.g., where the received signal(s) includes USB and/or UART signal(s)), the adapter 610 may relay the signal(s) received at the one or more connectors 611 to the data transmission system 600 via the UART output 612 and/or the USB output 613.

The adapter 610 may include one or more components configured to convert a particular type of non-USB or non-UART received signal into a USB signal or a UART signal. For example, if the one or more connectors 611 includes a particular non-USB or non-UART serial communications connector (e.g., RS-232, RS-485, etc.), the adapter 610 may include one or more electrical components configured to convert received non-USB or non-UART serial communications into USB and/or UART communications for transmission to the data transmission system 600.

If the one or more connectors 611 includes a USB and/or a UART serial communications connector and does not include any non-USB or non-UART serial communications connectors, the adapter 610 may not include electrical components configured to convert received signals into USB and/or UART and may instead only include one or more components configured to relay the received USB and/or UART signals to the data transmission system 600.

Being configured with adapters such as the adapter 610 (and the adapter 690 described below) that can accommodate a variety of physical interfaces and convert signals to/from USB/UART allows the data transmission system 600 to interoperate with a wide variety of POS, printer, and other devices while using UART/USB-based processing components such as the SoC 630. In particular embodiments, the adapter 610 may have multiple connectors 611 that allow multiple physical connectivity options for multiple types of input devices (e.g., the POS device 605). Alternatively, the data transmission system 600 may be configured with any one of a plurality of different types of adapters 610, each having single connector with a particular type of physical interface.

The data transmission system 600 may receive the UART and/or USB signal provided by the adapter 610 at a multiplexer (MUX) 621. The MUX 621 may then provide the signal to one or more other components via one or more outputs. In a particular embodiment, the MUX 621 may provide the received the UART and/or USB signal to a MUX 622. Like the MUX 621, the MUX 622 may provide the UART and/or USB signal received from the MUX 621 to one or more other components via one or more outputs. In various embodiments, each of the MUX 621 and the MUX 622 and/or their respective functionalities may be implemented in physically distinct components, while in other embodiments, the MUX 621 and the MUX 622 and/or their respective functionalities may be implemented within a single physical component.

In a particular embodiment, the MUX 622 may provide the received UART and/or USB signal to a "system on a chip" (SoC) 630. The SoC 630 may be an integrated circuit that includes computing device components, such as one or more computer processors 631 and one or more memory and/or data storage components 632. The SoC 630 may include a USB input 641 configured to receive a USB signal from the MUX 622. The SoC 630 may also, or instead, include a UART input 651 configured to receive a UART signal from the MUX 622.

In various embodiments, the SOC 630 may process the data received via the USB input 641 and/or the UART input 651 by executing, at the one or more computer processors 631, instructions stored on the one or more memory and/or data storage components 632. The one or more computer processors 631 may generate modified data that is then transmitted to the MUX 622 as a USB signal via a USB output 642 and/or as a UART signal via a UART output 652. The MUX 622 may transmit this modified data as UART and/or USB to the adapter 690 for communication to the printer 606. Further details are provided herein regarding the various aspects of the transmission, processing, and/or modification of data by a system such as the data transmission system 600.

The adapter 690 may be configured with one or more connectors 691 and a UART input 692 and/or a USB input 693. As with adapter 610, the one or more connectors 691 may include one or more connectors that each provide a physical interface for the transmission and/or reception of data using electrical signals. In particular embodiments, the one or more connectors 691 may include one or more standard physical interfaces such as an RS-232 interface, an RS-435 interface, any type of standard USB interface, any type of standard ethernet interface, etc. The adapter 690 may convert the UART signal received from the MUX 622 at the UART input 692 into the appropriate signal for each of the one or more connectors 691 for transmission to the printer 606. Alternatively, or in addition, the adapter 690 may convert the USB signal received from the MUX 622 at the USB input 693 into the appropriate signal for each of the one or more connectors 691 for transmission to the printer 606. Alternatively, or in addition, in embodiments where such signal conversion is unnecessary (e.g., where the one or more connectors 691 include USB and/or UART connectors, and therefore the output signal(s) is a USB and/or UART signal), the adapter 690 may relay the signal received at the UART input 692 and/or the USB input 693 to the one or more connectors 691 for transmission to the printer 606.

The adapter 690 may include one or more components configured to convert a USB signal and/or a UART signal into one or more particular types of non-USB or non-UART signals. For example, if the one or more connectors 691 includes a particular non-USB or non-UART serial communications connector (e.g., RS-232, RS-485, etc.), the adapter 690 may include one or more electrical components configured to convert USB and/or UART communications received from the data transmission system 600 into the particular non-USB or non-UART communications for transmission to the printer 606. In particular embodiments, if the one or more connectors 691 includes a USB and/or a UART serial communications connector, the adapter 690 may not include electrical components configured to convert received signals into USB and/or UART and may instead only include one or more components configured to relay the received signals to the printer 606.

In particular embodiments, the adapter 690 may have multiple connectors 691 that allow multiple physical connectivity options for multiple types of output devices (e.g., the printer 606). Alternatively, the data transmission system 600 may be configured with any one of several different types of adapters 690, each of which may be configured with a single connector having a particular type of physical interface.

The data transmission system 600 may further include wireless communications components 660 that may be communicatively connected to, and/or under the control of, the SoC 630. The wireless communications components 660 may be configured to transmit and/or receive wireless communications of any type. In particular embodiments, the data transmission system 600 may include one or more Wi-Fi components 680 that may include one or more Wi-Fi antennas 681 and a Wi-Fi processor 682. The Wi-Fi components 680 may use any suitable version and specification of any wireless communications technology, such as IEEE 802.11. In particular embodiments, the data transmission system 600 may also, or instead, include one or more Bluetooth components 670 that may include one or more Bluetooth antennas 671 and a Bluetooth processor 672. The Bluetooth components 670 may use any suitable version and/or specification of Bluetooth. The wireless communications components 660 may be configured to exchange data communications via the wireless computer network 608 with one or more external devices, such as one or more remote systems 609. The data transmission system 600 may receive and/or transmit data to one or more remote systems 609 as part of the processing of data as described in more detail herein.

The components of the data transmission system 600 may be grouped into two logical, interrelated subsystems. A primary subsystem 601 may include the components that are used under normal operating conditions (e.g., when power is available, valid instructions are available for execution at the SoC 630, the data transmission system is connected to a wireless network, etc.). A fallback subsystem 602 may include the components that are used under other conditions. Components of the primary subsystem 601 may also be included in the fallback subsystem 602 and vice-versa. In particular embodiments, the MUX 621 exchanges control signals (or detects a lack thereof) with the SoC 630 to determine operating conditions and switch its output. As described in further detail below, when not operating under normal conditions, the MUX 621 may switch its output to transmit the data received from the adapter 610 directly to the UART input 692 and/or the USB input 693 of the adapter 690 for communication to the printer 606.

The power for the data transmission system 600 may be provided via either or both of the adapters 610 and 690. In a particular embodiment, the data transmission system 600 may be configured to receive 5V power from the printer 606 via the adapter 690. In such embodiments, the MUX 621 may be configured to detect whether power is available from one of the adapters and switch its output based on whether such power is available. Alternatively, or in addition, data transmission system 600 may be configured with a source of power separate from the adapters 610 and 690, for example by the use of a 'Y' cable between one of the adapters 610 and 690 and the data transmission system 600. Alternatively, or in addition, data transmission system 600 may be configured with an independent means of receiving power, for example an integrated battery or other power supply or a means of receiving power directly or indirectly from an AC power source, such as a standard power outlet.

As noted above, a system, such as the data transmission system 600, may take the form factor of a cable and may be used in place of a typical cable that merely passes electrical signals. For example, the data transmission system may be in the form of an elongated, flexible, substantially cylindrical cable that includes a single adapter adjacent each respective end of the cable and that comprises a housing intermediate the respective ends of the cable for housing one or more computer hardware components of the data transmission system 600. In alternative embodiments, the cable may have a non-circular cross-section and/or include multiple adapters adjacent one or more of its ends.

Figure 7:
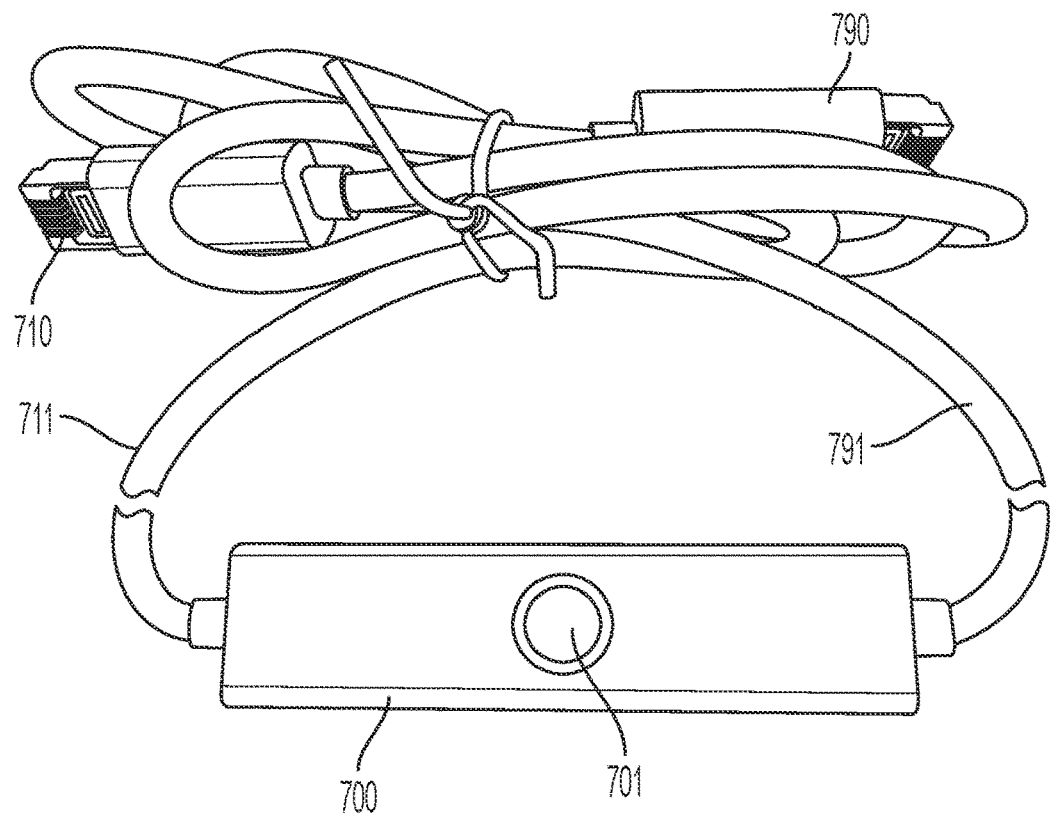
FIG. 7 is an illustration of an exemplary smart data cable system according to various embodiments.

FIG. 7 illustrates an example of such a system according to a particular embodiment. The system 700 shown in FIG. 7 may include a small housing (e.g., slightly wider than a cable) that encapsulates a system such as a computing system associated with the data transmission system 600. The system 700 may be configured with adapters 710 and 790 using cables 711 and 791, respectively. As shown in this figure, the adapters 710 and 790 may each include a single non-USB/non-UART physical interface configured to transmit and receive serial communications. In this example, the adapters 710 and 790 are each configured with an RJ11 connector. The adapters 610 and 690 described above may take the form of the adapters 710 and 790, respectively, as shown in this figure. The adapters 710 and 790 may each include various electrical components configured to covert non-USB/non-UART serial communication to/from USB and/or UART communications. The system 700 may also include an indicator/button 701 that may provide a visual indication of system power and/or status and may provide a simple means of providing input to the system 700 (e.g., power on, power off, mode setting, etc.).

Figure 8:
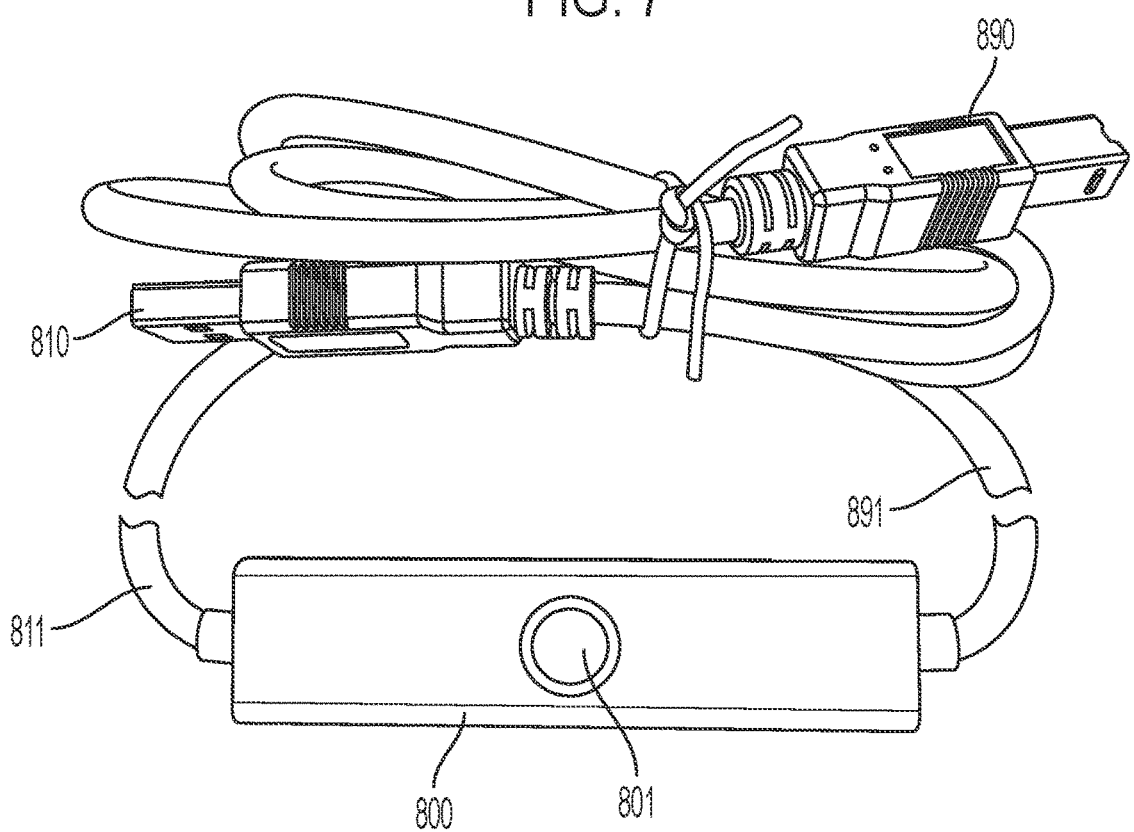
FIG. 8 is an illustration of another exemplary smart data cable system according to various embodiments.

FIG. 8 illustrates another example of a system such as the data transmission system 600 according to a particular embodiment. The system 800 shown in FIG. 8 may be in a similar physical configuration as the system 700 shown in FIG. 7, described above, except that it may include a single USB connector adjacent each of its respective ends (e.g., a USB Type A connector adjacent a first end and a USB Type B connector adjacent a second end). In this embodiment, the system includes a similarly small housing (e.g., slightly wider than a cable) that encapsulates one or more computer hardware components of the data transmission system 600.

As shown in FIG. 8, the system 800 may be configured with adapters 810 and 890 using cables 811 and 891, respectively. As noted above, the adapters 810 and 890 may each include a single USB physical interface configured to transmit and receive serial communications. In this example, the adapter 810 is configured with a USB Type A connector and the adapter 890 is configured with a USB Type B connector. The adapters 610 and 690 described above may take the form of the adapters 810 and 890, respectively, as shown in this figure. The adapters 810 and 890 may each include one or more various electrical components configured to relay USB serial communications to/from the system 800 (but, unlike the system 700 in FIG. 7, may not include electrical components configured to covert non-USB/non-UART serial communication to/from USB and/or UART communications). The system 800 may also include an indicator 801 that may provide a visual indication of system power and/or status and may provide a simple means of providing input to the system 800 (e.g., power on, power off, mode setting, etc.).

In various embodiments, a system, such as the data transmission system 600, may be fully integrated into the housing of a printer, a POS device, and/or one or more other devices. Alternatively, any one or more of the components of the data transmission system 600 described herein may be fully integrated into the housing of a printer, a POS device, and/or one or more other devices. In such embodiments, the data transmission system and the other device(s) may utilize one or more shared common components (e.g., memory, wireless communications components, processors, etc.) to implement any of the various embodiments described herein.

Data Transmission System Operation

The operation of various embodiments of a data transmission system will now be described. Referring again to FIG. 6, the POS device 605 may be connected to the one or more connectors 611 and transmit a communications signal to the adapter 610 via the one or more connectors 611. The POS device 605 may generate such a communications signal in the course of processing a commercial transaction, such as receiving payment for goods or services and/or printing an invoice and/or receipt for the sale of services or goods, such as food. In a particular embodiment, the communications signal may include instructions intended for a printer (e.g., the printer 606) instructing the printer to print a receipt associated with the transaction. In various other embodiments, the communications signal generated by the POS device 605 may be intended for any other purpose and/or destination device. The communications signal may include transaction data associated with a particular sale transaction or other type of transaction.

If the communications received at the one or more connectors 611 is not USB or UART communications, the adapter 610 may convert the received communications to USB communications and/or UART communications and provide the converted communications to the USB output 613 and/or the UART output 612, respectively. If the communications received at the one or more connectors 611 is USB and/or UART communications, the adapter 610 may relay the received communications to the USB output 613 and/or the UART output 612, respectively. The USB output 613 and/or the UART output 612 may then transmit the communications signal to the MUX 621.

The MUX 621 may switch the received USB/UART communication signal to a particular output based on one or more of various criteria. In a particular embodiment, the MUX 621 may be configured to transmit received signals to the MUX 622 when the MUX 621 is receiving at least a particular level of power (e.g., at least 5V). When the MUX 621 does not detect a minimum level of power (e.g., detects less than 5V), the MUX 621 may instead switch received signals to the adapter 690. In this way, the MUX 621 can ensure communication can be maintained between the POS device 605 and the printer 606 in the event of a power loss to the data transmission system 600. The MUX 621 may receive power from the SoC 622 or from any other component of the data transmission system 600.

Alternatively, or in addition, the MUX 621 may be configured to transmit received signals to either the MUX 622 or to the adapter 690 based on other detected condition and/or based on received instructions and/or configurations. In particular embodiments, the MUX 621 may receive an instruction or signal from the SoC 630 configuring the MUX 621 to transmit received signals to one or both of the MUX 622 and the adapter 690. For example, the SoC 630 may be configured to perform data processing and/or modification only when it has established a wireless communications session with a remote device (e.g., has an active Bluetooth or Wi-Fi communications session). When the SoC 630 is unable to confirm that such a communications session is active, the SoC 630 may transmit a signal to the MUX 621 causing it to transmit received signals to the adapter 690. When the SoC 630 successfully establishes or confirms such a communications session, the SoC 630 may transmit a signal to the MUX 621 causing it to transmit received signals to the MUX 622.

Under normal operating conditions, the MUX 621 may transmit the USB/UART communication signal received from the adapter 610 to the MUX 622. The MUX 622 may then transmit this signal to one or both of the UART 651 and the USB 641 inputs of the SoC 630 for processing. The one or more computer processors 631 of the SoC 630 may execute instructions stored in the one or more memory and/or data storage components 632 to perform processing of the received signal. One part of this processing may be storage of the transaction data originally generated by the POS device 605 that is included in the received signal. The SoC 630 may analyze the transaction data to determine whether and how to modify this data. For example, the SoC 630 may determine a retailer name, a sales amount, one or more portions of the sales amount (e.g., subtotals, sales tax, etc.), items purchased, date and time of the sale, etc.

Using the transaction data, the SoC 630 may determine whether and how to modify the transaction data. In particular embodiments, the SoC 630 may determine any modifications based on locally stored data and instructions (e.g., stored at the one or more memory and/or data storage components 632). For example, the SoC 630 may be configured to augment the transaction data with a coupon that offers a discount to the customer. In such an embodiment, the SoC 630 may be configured to select a particular coupon for addition to the transaction data based on the sales amount of the transaction (e.g., customers spending $2,000 or less get a coupon for 5% off a future purchase, customers spending $20.01-$50.00 get a coupon for 10% of a future purchase, customers spending $50.01 or more get a coupon for 15% of a future purchase, etc.). In other examples, the SoC 630 may be configured to insert personalized messages (e.g., a greeting using a name determined from the transaction data), product instructions (e.g., based on the type of product purchases as determined from the transaction data), proposed tip (e.g., calculated based on the amount of the sale), etc.

In various embodiments, in determining how and whether to modify the transaction data, the SoC 630 may communicate (e.g., using Wi-Fi components 680 or Bluetooth components 670) with a remote system 609 via the wireless computer network 608 to request and receive data related to the transaction. For example, the SoC 630 may generate a request to create a transaction record for the transaction based on the transaction data. The SoC 630 may instruct the wireless communications components 660 to transmit that request via Wi-Fi or Bluetooth to the remote device 609 via the wireless computer network 608. In response, the remote device 609 may generate the transaction record and transmit data associated with the transaction record back to the wireless communications components 660 via the wireless computer network 608. Using this transaction record data, the SoC 630 may determine and generate additional information that is to be appended to the transaction data (e.g., included in the receipt ultimately printed by the printer 606).

In a particular embodiment, such transaction record data may include data that allows the SoC 630 to generate one or more scannable indicia, such as Quick Response (QR) code, that, when scanned by a computing device (e.g., smartphone), directs that computing device to a particular website associated with the transaction. For example, the data transmission system 600 may interact with a remote payment system to generate a QR code that, when scanned by a customer's smartphone, allows the customer to provide payment for the transaction via the remote payment system using the customer's smartphone. In this example, the SoC 630 may insert this QR code into the transaction data such that the QR code is ultimately printed on the receipt by the printer 606.

In a particular embodiment, additional transaction data received from a remote system may include data that allows the SoC 630 to generate a personalized coupon or offer based on a customer's status or membership with a merchant or other entity. For example, the data transmission system 600 may interact with a remote merchant system to determine that, based on the transaction data transmitted to the remote merchant system by the data transmission system 600, the customer is a frequent shopper at the particular merchant. In this example, the SoC 630 may automatically append the transaction data with a coupon customized for this particular customer, apply a discount to the purchase price of the transaction based on the customer's shopper status, and/or modify the transaction data in some other way based on the customer's shopper status.

The SoC 630 may store the modified transaction data in the one or more memory and/or data storage components 632. The SoC 630 may provide the modified transaction data as USB and/or UART communications to the USB 642 output and/or the UART 652 output, respectively. The USB 642 output and/or the UART 652 output may then transmit the USB and/or UART communications to the MUX 622. The MUX 622 may transmit the received USB and/or UART communications to the USB 693 input and/or the UART 692 input, respectively, of the adapter 690.

If any of the one or more connectors 691 is not a USB or UART connector, the adapter 690 may convert the USB and/or UART communications received from the MUX 622 at the USB 693 input and/or the UART 692 input into the appropriate signal for each of the non-USB or non-UART connectors of the one or more connectors 691 for transmission to the printer 606. If the one or more connectors 691 includes a USB and/or a UART serial communications connector, the adapter 690 may relay the USB and/or UART communications received from the MUX 622 to the printer 606.

In response to receiving the modified transaction data represented by the communications signal transmitted from the adapter 690, the printer 606 may print a receipt that includes the original transaction data intended for the receipt by the POS device 605 as modified and/or augmented by the data transmission system 600. Alternatively, or in addition, where the MUX 621 transmits the communications signal received from the adapter 610 directly to the USB 693 input and/or the UART 692 (e.g., loss of power condition), the printer 606 may print a receipt that includes the original transaction data as provided by the POS device 605.

In various embodiments, the data transmission system 600 may operate without physical connection to one of the POS device 605 or the printer 606. For example, the data transmission system 600 may perform any of the data transmission and/or modification processes described herein using data received from a remote device via the wireless communications components 660. In a particular embodiment, the data transmission system 600 may receive transaction data from the one or more remote systems 609 (or any other remote system), process the transaction data as described herein, and transmit the modified transaction data to the printer 606. Alternatively, or in addition, the data transmission system 600 may receive transaction data from the POS device 605, process the transaction data, and generate modified transaction data as described herein, but then transmit the modified transaction data to the one or more remote systems 609 (or any other remote system) using the wireless communications components 660.

Exemplary Data Transmission Process

Figure 9:
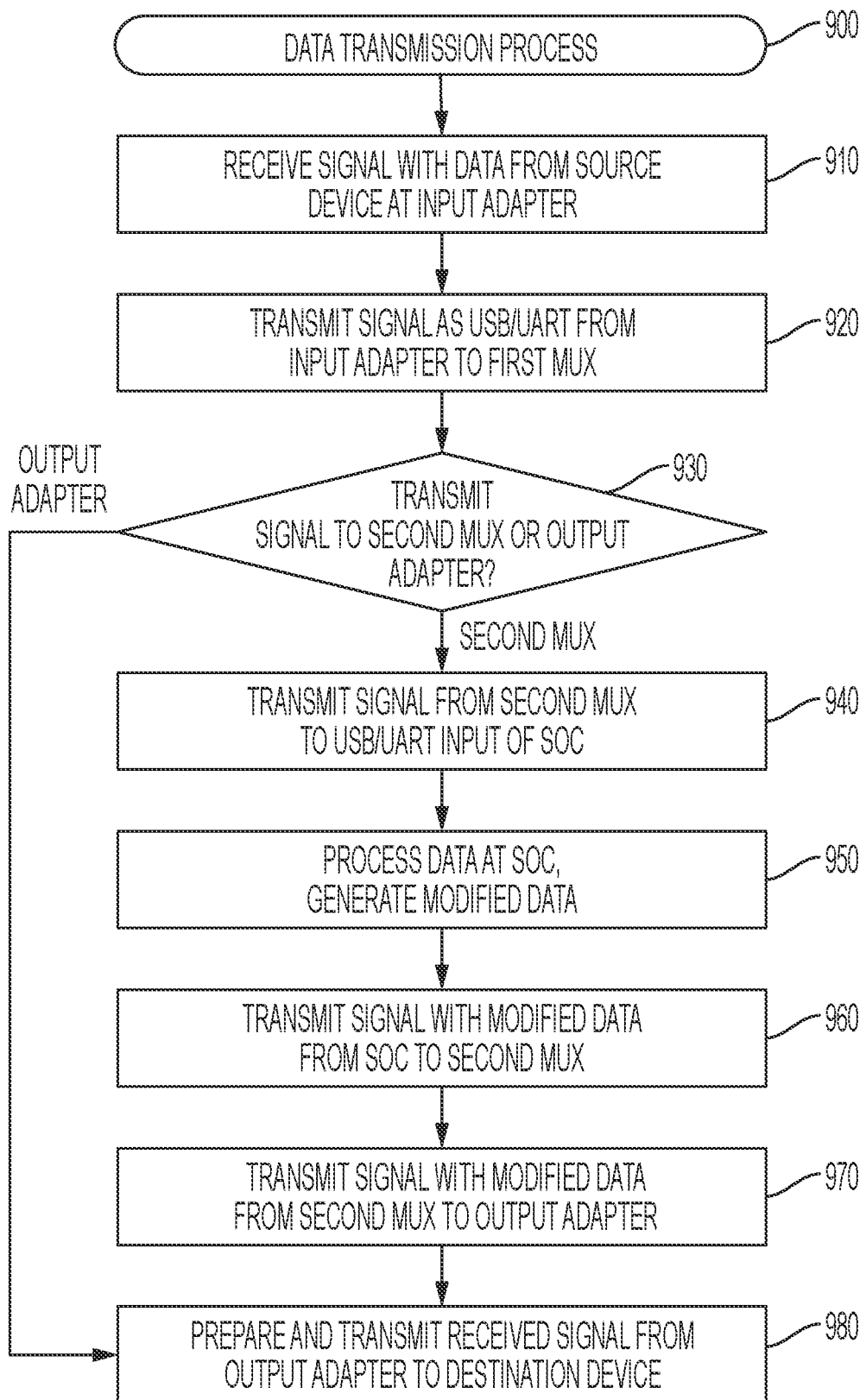
FIG. 9 is a block diagram of an exemplary process for modifying data according to various embodiments.

FIG. 9 illustrates an example Data Transmission Process 900 that may be performed by a data transmission system, such as the data transmission system 600, according to various embodiments. In performing the Data Transmission Process 900, the system begins at Step 910 by receiving a signal containing data (e.g., transaction data) transmitted by a source device. The source device may be a physically connected device (e.g., POS, cash register, computer, smartphone, etc. as described above) or a wirelessly connected device (e.g., a remote system communicating with the data transmission system using wireless communications components as described above). In physical input connection embodiments, the data may be received at one or more connectors configured at an adapter. In wireless input connection embodiments, the data may be received at wireless communications components.

In physical input connection embodiments, at Step 920, the system may provide the received signal from the adapter as a USB and/or UART signal to a first MUX. If the received signal is already in the form of a USB or UART signal, at Step 920 the adapter may simply relay the signal to the first MUX. Alternatively, if the received signal is in another form, the adapter may convert the signal (e.g., using components configured at the adapter) into a USB and/or UART signal and then transmit the converted signal to the first MUX.

In physical input connection embodiments, at Step 930, the first MUX determines whether to provide the received USB and/or UART signal to a second MUX or to an output adapter. In particular embodiments, the first MUX may be configured to determine whether the detected power is above a particular threshold of power (e.g., detect whether the system is receiving sufficient power). If not, the first MUX may switch any received signal to the output adapter, moving to Step 990, bypassing other components of the system that may be inoperable due to lack of sufficient power. If the first MUX detects sufficient power, it may switch the received signal to one or more other components of the system for further processing.

Alternatively, or in addition, the first MUX may receive a signal or instruction from another component of the system, such as a processor, instructing the first MUX on how to switch the signal. For example, the system processor may determine that it is unable to process data currently and may instruct the first MUX to switch any received signal to the output adapter, proceeding to Step 990. If the processor is currently capable of processing data normally, the processor may instruct the first MUX to switch any received signal to one or more other components of the system for processing.

In response to receiving the signal from the first MUX at the second MUX, at Step 940 the second MUX transmits the signal to USB and/or UART inputs of an SoC for processing. At Step 950, the SoC processes the received signal by extracting the data represented by the signal and determining whether and how to modify the data (e.g., as described herein). In physical input connection embodiments, the SoC may process the signal as received from the second MUX, while in wireless input connection embodiments, the SoC may process the signal as received from one or more wireless communications components. In particular embodiments, the SoC determine whether and how to modify the received data based at least in part on the data itself. In particular embodiments, the SoC may also, or instead, determine whether and how to modify the data based at least in part on locally stored instructions executed by the SoC's processor(s). Alternatively, or in addition, the SoC may determine whether and how to modify the data based at least in part on communications exchanged with one or more remote systems. Further at Step 950, the SoC may generate the modified data that is to be transmitted to the destination device.

The destination device may be a physical connected device (e.g., POS, cash register, computer, smartphone, etc. as described above). In such physical output connection embodiments, at Step 960, the SoC may transmit the modified data in a USB/UART signal back to the second MUX. At Step 970, the second MUX may transmit the signal to an output adapter. At Step 980, the output adapter may convert the received USB and/or UART signal (received from either the second MUX or the first MUX) to another form for transmission to a destination device via a non-USB and/or a non-UART connector (e.g., as described herein). Alternatively, or in addition, at Step 980 the output adapter may relay the received USB and/or UART signal to a destination device via a USB and/or a UART connector.

Alternatively, or in addition, the destination device may be a wirelessly connected device (e.g., a remote system communicating with the data transmission system using wireless communications components as described above). In such wireless output connection embodiments, returning the Step 960, the modified data may be transmitted to one or more remote systems using one or more wireless communications components rather than to the second MUX.

Overview of Data Transmission System Interoperation with Remote Systems

The operation of various embodiments of a system that includes one or more data transmission systems, and one or more remote systems will now be described. Referring to FIG. 10, a system 1000 may include a data transmission system 1001, which may be, for example, a data transmission system such as the data transmission system 600 described in regard to FIG. 6. The data transmission 1001 may include any of the components and other operational aspects of the data transmission system 600. The data transmission system 1001 may be communicatively connected to a POS device 1005 and/or a printer 1006. The data transmission system 1001 may interoperate with the POS device 1005 and/or the printer 1006 according to any of the various embodiments described herein, including as described in regard to the operation of the data transmission system 600, the POS device 605, and the printer 606 of FIG. 6.

The data transmission system 1001 may include Wi-Fi components and/or Bluetooth components that allow it to communicate with one or more remote systems via one or more computer networks 1010. The one or more computer networks 1010 may be any one or more networks that facilitate communication between two or more computing devices. The one or more computer networks 1010 may include components that facilitate wired communications, wireless communications, or any combination thereof. In various embodiments, the one or more computer networks 1010 may include the Internet. In particular embodiments, the data transmission system 1001 may communicate wirelessly (e.g., using Wi-Fi and/or Bluetooth components configured at the data transmission system 1001) via the one or more computer networks 1010 with one or more remote systems that may also be communicatively connected (e.g., via wired and/or wireless communications means) to the one or more computer networks 1010.

The system 1000 may include a second data transmission system 1091, which may also be, for example, a data transmission system such as the data transmission system 600 described in regard to FIG. 6. The data transmission 1091 may include any of the components and other operational aspects of the data transmission system 600. The data transmission system 1091 may be communicatively connected to a POS device 1095 and/or a printer 1096. The data transmission system 1091 may interoperate with the POS device 1095 and/or the printer 1096 according to any of the various embodiments described herein, including as described in regard to the operation of the data transmission system 600, the POS device 605, and the printer 606 of FIG. 6. The data transmission system 1091 may also, or instead, interoperate with the data transmission system 1001 as described in more detail below. In particular embodiments, the data transmission system 1091 may communicate wirelessly (e.g., using Wi-Fi and/or Bluetooth components configured at the data transmission system 1091) via the one or more computer networks 1010 with one or more remote systems that may also be communicatively connected (e.g., via wired and/or wireless communications means) to the one or more computer networks 1010.

Data Transmission System Facilitation of Mobile Payments

In various embodiments, the data transmission system 1001 may take one or more actions to facilitate the use of one or more mobile payment systems. The data transmission system 1001 may use information included in data received from the POS device 1005 and/or data otherwise intended for the printer 1006 to facilitate one or more mobile payments. For example, the data transmission system 1001 may receive transaction data generated by the POS device 1005 (e.g., in a signal received from the POS device 1005). One or more processing components of the data transmission system 1001 may process the transaction data and generate a request for payment information. The request for payment information may include some or all of the transaction data. The transaction data may include any transaction data, such as a retailer name or other merchant identifier, a sales amount, an associated employee identifier, a branch or location identifier, one or more portions of the sales amount (e.g., subtotals, sales tax, etc.), one or more items purchased, date and time of the transaction, etc. The system may provide this request to one or more wireless communications components configured at the data transmission system 1001 for transmission to a payment processing system 1040 for processing. The data transmission system 1001 (or another data transmission system) may then receive responsive data from the payment processing system 1040 that the data transmission system 1001 (or the other data transmission system) can use to facilitate a mobile payment by a customer, as described in more detail herein.

In particular embodiments, the data transmission system 1001 may transmit data received from the POS device 1006 in a "raw" form (e.g., relatively unchanged) to the payment processing system 1040 as a request for payment information. The payment processing system 1040 may then take one or more actions to process the transaction data as received from the data transmission system 1001 and determine the appropriate responsive data to transmit back to the data transmission system 1001 for facilitating a mobile payment. In such embodiments, the raw transaction data may be sufficient for the payment processing system 1040 to determine the merchant and payment data that may be required to facilitate a mobile payment for the transaction.

Alternatively, the data transmission system 1001 may transmit additional data to the payment processing system 1040 along with some or all of the transaction data received from the POS device 1005 as a request for payment information. For example, the data transmission system 1001 may augment the transaction data received from the POS device 1005 with additional information that may be used by the payment processing system 1040 to generate payment data that can be used to facilitate a mobile payment. In a particular embodiment, the data transmission system 1001 may augment its transmission to the payment processing system 1040 with identifying information (e.g., merchant identifier, account number, payment routing information, etc.) that may allow the payment processing system 1040 to determine with which merchant the transaction should be associated and/or where a payment received by the payment processing system 1040 for the transaction should be directed. Note that the data transmission system 1001 may be configured to not provide merchant payment information details to the printer 1006, as such sensitive merchant information is not typically made available to customers. In various embodiments, such information would only be provided (e.g., securely) to the payment processing system 1040 so that the payment processing system 1040 could generate the data needed to collect payment for the transaction and provide the payment to the merchant.

Alternatively, or in addition, the data transmission system 1001 may transmit generated data to the payment processing system 1040 as a request for payment information. For example, as described herein, the data transmission system 1001 may generate data intended for transmission to the payment processing system 1040 based on the transaction data received from the POS device 1005. The data transmission system 1001 may format, modify, augment, and/or otherwise generate data associated with the received transaction data in a form suitable for processing by the payment processing system 1040. For example, the data transmission system 1001 may encapsulate and/or augment the transaction data with a request for mobile payment data, where the request is recognizable by the payment processing system 1040. The payment processing system 1040 may then use this data sent by the data transmission system 1001 to generate payment data that it then transmits back to the data transmission system 1001.

The data transmission system 1001 may receive payment data from the payment processing system 1040 in response to the transaction data transmission. This payment data may take any suitable form, such as a scannable code or indicium (e.g., a QR code) that can be scanned by a customer's mobile device (e.g., smartphone, tablet computer, or laptop computer) to allow payment using that mobile device and/or information that allows the data transmission system 1001 to generate such a code. The data transmission system 1001 may then integrate this payment data into a signal transmitted to the printer 1006 so that mobile payment information (e.g., a QR code) may be included on a receipt or other document printed by the printer 1006. The customer may then use the information on the receipt, along with a mobile device, the provide a payment for the associated transaction (e.g., by using their mobile device to scan the QR code printed on the receipt, which results, for example, in a browser on the mobile device being used to visit a uniform resource locator (URL) associated with a payment system that the customer can use to pay for the transaction—for example, by paying the total printed on the receipt and/or a related payment such as the payment of a tip).

In particular embodiments, rather than a printer, the data transmission system 1001 may integrate payment data into a signal transmitted to a tablet or other computing device configured with a display so that the computing device can display the mobile payment information (e.g., a QR code) for scanning by a customer mobile device. Alternatively, or in addition, the data transmission system may transmit the payment data received from the payment processing system 1040 and/or any data that the data transmission system 1001 may generate based on such payment data to one or more other systems, such as one or more of the data archiving system 1030, the business management system 1050, and the consumer data collection system 1060.

In this way, the data transmission system 1001 allows for the use of mobile payment technologies at a particular retail outlet without requiring the costly upgrading of legacy equipment at that outlet. For example, the data transmission system 1001 may be placed between a legacy POS device and a legacy printer, neither of which may be configured for mobile payments or Internet connectivity. The data transmission system 1001 may receive transaction data for a particular transaction from the legacy POS device, interact with the payment processing system 1040 to obtain scannable (e.g., by printing or presenting on a display) payment information recognizable to an application on a mobile device, and transmit the payment information to the legacy printer for printing on a receipt or to a device with a display, allowing a customer to use the payment information to make a payment using the customer's mobile device, for example, as discussed above.

The payment processing system 1040 may also store the transaction data and/or any determined payment data in a database for future retrieval. In this way, the system may facilitate the storage and identification of transactions and payments, for example, for multiple particular locations, without requiring that the POS devices at each such location be upgraded with Internet connectivity or other costly components. The payment processing system 1040 may use one or more databases or other data structures for managing such data and one or more APIs for providing access to such data (e.g., as described above in regard to the remote systems 1030, 1050, and 1060).

In various embodiments, two or more data transmission systems may interoperate to simulate a single payment system using peripheral devices that are remotely located. For example, a first data transmission system 1001 may receive transaction data from the POS device 1005 that it then uses to generate a payment information request. The first data transmission system 1001 may transmit this payment information request to the payment processing system 1040 which may, in response, determine the payment information. However, rather than sending the requested payment information back to the first data transmission system 1001, which transmitted the payment information request, the payment processing system may send the requested payment information to a second data transmission system 1091, which may not be located proximate to the first data transmission system 1001 (e.g., located at a different location, in a different room, etc.). The second data transmission system 1091 may then provide the payment information generated by the payment processing system 1040 to the printer 1096 for printing and presentation to a customer.

In particular embodiments, the payment information request generated by the data transmission system 1001 may include instructions or other data directing the payment processing system 1040 to send the generated payment information to a particular data transmission system. For example, there may be multiple data transmission systems available as destination locations for printed receipts with payment information. Each data transmission system 1001 may include in its payment information request a code or other indicator of the intended destination data transmission system 1091. Alternatively, or in addition, the payment processing system 1040 may be configured to transmit payment information to one or more particular data transmission systems by default or based on a user configuration in response to receiving a payment information request from a particular data transmission system (e.g., in response to any request received from the data transmission system 1001, the payment processing system 1040 may transmit payment information to the data transmission system 1091).

In this way, the data transmission systems 1001 and 1091 may allow relatively simple POS devices, printers, and other devices to interoperate as if they were physically connected when they are not physically proximate to one another. For example, a restaurant may receive a take-out order via a telephone or via a terminal in a non-public location (e.g., a "ghost" kitchen, back office, etc.) that is not proximate to the public location where customers would pick up such orders (e.g., store front, drive-through, etc.). The order may be entered into a POS device connected to a first data transmission system at the non-public location. The first data transmission system may then communicate with a payment processing system that processes the transaction and generates payment information for the order. The payment processing system may then transmit the payment information to a second data transmission system configured with a printer at the public location. The second data transmission system can then use this information to instruct the printer at the public location to print out a receipt that allows a customer to pay for the take-out order when it is picked up.

In various embodiments, the system 1000 may allow legacy POS devices, printers, and other devices to interoperate with internet-based systems as if they were physically connected to such systems. For example, a restaurant may receive a take-out or delivery order via a website with which a customer is interacting using the customer's computing device (e.g., smartphone, tablet, computer, etc.). The order may be entered into such a website that collects the information and communicates with a transaction and payment processing system that processes the transaction and interacts with the customer to collect payment for the order. The transaction and payment processing system (or another restaurant backend system in communication with the restaurant website) may transmit the order information to a data transmission system configured with a printer at a location of a kitchen for preparation of the order. The kitchen data transmission system can then use this information to instruct the printer at the kitchen location to print out the order and/or present the order on a display so that the kitchen staff can prepare the order (e.g., for pick up or delivery). The kitchen data transmission system may also instruct a kitchen printer to print a receipt for the order that can accompany the food when it is picked up by the customer or for delivery.

It should be understood in the example above that, in various embodiments, one or more of the kitchen printers may be attached to a smart data cable that may or may not be connected to a POS device. The kitchen data transmission system may comprise or consist of this smart data cable. In an alternative embodiment, the kitchen printers may include the functional components of the smart cable within the interior of the printers themselves (thus eliminating the need for a separate cable).

In various embodiments, the payment processing system 1040 may interact with one or more external payment processing systems to obtain and/or generate the payment information requested by the data transmission system 1001. In particular embodiments, in response to receiving the request for payment information (e.g., that includes transaction data) from the data transmission system 1001, the payment processing system 1040 may generate a subsequent request for payment information that contains some or all of the data in the request received from the data transmission system 1001 and transmit that request to an external payment processing system 1045. Alternatively, or in addition, the payment processing system 1040 may generate the subsequent request for payment information based on the request received from the data transmission system 1001 and transmit the subsequent request to the external payment processing system 1045.

The payment processing system 1040 may generate a unique identifier for the request for payment information received from the data transmission system 1001 (e.g., for the transaction associated with the request for payment information). The payment processing system 1040 may include this unique identifier in the subsequent request for payment information that it generates and sends to the external payment processing system 1045. The external payment processing system 1045 may use the unique identifier, along with the data (e.g., transaction data) received from the payment processing system 1040, to generate a unique webpage accessible via a unique link that may be used to process the transaction associated with the request for payment information.

This unique link for the particular transaction may be generated using a particular methodology that may be known to both the payment processing system 1040 and the external payment processing system 1045. For example, the unique link may be a unique URL that ends in the unique identifier for the particular transaction. In a particular embodiment, the payment processing system 1040 and/or the external payment processing system 1045 may translate this unique URL into a QR code or otherwise generate a QR code based on the unique URL. This QR code may then be transmitted to the data transmission system 1001 and/or the data transmission system 1091 for printing on a receipt or other display means for presentation to a customer. Once presented on a receipt or otherwise displayed to a customer, the customer may then scan the QR code using the customer's smartphone or other computing device, which, in response, results in the customer's computing device presenting the unique payment page at the unique URL. The customer may then provide payment for the transaction using any suitable payment method using the displayed payment page (e.g., via any suitable payment method such Apple Pay, PayPal, Google Pay, or through manual entry of credit card or debit card information). Note that in various embodiments, instead of, or in addition to, a QR code, the system may generate one or more other indicia associated with the unique URL for presentation to the customer.

In response to receiving payment from the customer, the external payment processing system 1045 may transmit data to the customer confirming payment for the transaction. The external payment processing system 1045 may also, or instead, transmit data to the payment processing system 1040 confirming payment for the transaction. This payment confirmation may include payment details, such as an amount of tip, subtotals for one or more taxes associated with the transaction, whether and how payment for the transaction was split into multiple payments, etc.

In a particular example, in response to receiving this payment confirmation, the payment processing system 1040 may transmit data to an application running on one or more computing devices associated with the operator of the data transmission system associated with the transaction. For example, the payment processing system 1040 may transmit a payment confirmation to an application running on a tablet 1007 located at the location where the transaction was initiated (e.g., adjacent to the data transmission system 1001). This application may provide a listing of transactions, a payment status for each transaction, and/or payment details for each transaction. Alternatively, or in addition, in embodiments where the transaction may be completed at a different location than where the transaction was initiated, the payment processing system 1040 may transmit a payment confirmation to a smartphone 1097 or other computing device located at the location where the transaction was completed (e.g., adjacent to the data transmission system 1091). One or more of device 1007 and 1097 may be a smart phone, tablet, or other computer device located adjacent to a transaction location. The payment processing system 1040 may also, or instead, employ alternative means of payment confirmation, such as text messages or voice calls.

In particular embodiments, the payment processing system 1040 may transmit instructions to a data transmission system to transmit printer or other display data confirming payment. For example, in response to receiving payment confirmation from the external payment processing system 1045, the payment processing system 1040 may transmit instructions to the data transmission system 1001 to send printer data to the printer 1006 that will instruct the printer 1006 to printer a receipt indicating that payment for a transaction has been received. Alternatively, or in addition, in response to receiving payment confirmation from the external payment processing system 1045, the payment processing system 1040 may transmit instructions to the data transmission system 1091 to send printer data to the printer 1096 that will instruct the printer 1096 to print a receipt indicating that payment for a transaction has been received.

In various embodiments, the payment processing system 1040 may provide transaction data, payment information, and/or any other data that it receives, processes, and generates to one or more other systems for further processing as described herein. For example, one or more of the data archiving system 1030, the business management system 1050, and/or the consumer data collection system 1060 may be operated by the same entity that operates the payment processing system 1040. In such embodiments, the payment processing system 1040 may transmit any of the data received, processed, and/or generated based on one or more communications exchanged with any one or more of the data transmission system 1001, the data transmission system 1091, or the external payment processing system 1045 to any one or more of the Data Archiving System 1030, Business Management System 1050, or Consumer Data Collection System 1060. The payment processing system 1040 may also, or instead, provide data to other external systems such as one or more external accounting systems (e.g., Quickbooks), inventory management and/or tracking systems, etc. By providing data to such other systems after a transaction is complete, the payment processing system 1040 may be configured to provide complete transaction data, reflecting tip amounts, total tax, payment confirmation, etc.

Data Archiving Using a Data Transmission System

In various embodiments, the data transmission system 1001 may take one or more actions to facilitate the archiving of data that it receives, transmits, generates, or otherwise processes, such as data received from the POS device 1005 and/or data that the data transmission system 1001 generates for transmission to the printer 1006. For example, the data transmission system 1001 may receive data generated by the POS device 1005 (e.g., in a signal received from the POS device 1005). One or more processing components of the data transmission system 1001 may provide this data to one or more wireless communications components configured at the data transmission system 1001 for transmission to a data archiving system 1030 for storage and potential future retrieval. This data may include transaction data, such as a retailer name, a sales amount, an associated employee identifier, a branch or location identifier, data and time information, employee information, one or more portions of the sales amount (e.g., subtotals, sales tax, tip, etc.), particular items purchased, quantities of particular items purchased, etc. Alternatively, or in addition, this data may include non-transaction data, such as shift data (e.g., one or more shift times, one or more employees working at a particular time, one or more locations, etc.) and/or any other type of data.

In particular embodiments, the data transmission system 1001 may transmit data received from the POS device 1005 in a "raw" form (e.g., relatively unchanged) to the data archiving system 1030. The data archiving system 1030 may then take one or more actions to archive the data received from the data transmission system 1001.

Alternatively, the data transmission system 1001 may transmit additional data along with the raw data received from the POS device 1005. For example, the data transmission system 1001 may augment the raw data received from the POS device 1005 with additional information that may be stored and/or used by the data archiving system 1030. In a particular embodiment, the data transmission system 1001 may augment a transmission to the data archiving system 1030 with identifying information that may allow the data archiving system 1030 to properly archive the data. Such information may or may not be related to the data received from the POS device 1005 (e.g., this information may be unrelated to a particular transaction represented by the received data). The augmentation information generated by the data transmission system 1001 may include information that is not available to the POS device 1005 and therefore not present in the data received from the POS device 1005 (e.g., location information, store identifier, codes, etc.). In this way, the data transmission system 1001 allows for the offsite archiving data at a particular location without requiring the upgrading of legacy equipment at that location. Any additional information that the data transmission system 1001 generates for transmission to the data archiving system 1030 with raw data may, or may not, be included in data that is ultimately transmitted to the printer 1006.

In various embodiments, the data transmission system 1001 may be placed (functionally and/or physically) between a legacy POS device and a legacy printer that may not be configured for indicating a particular retail location. The data transmission system 1001 may receive transaction data for a particular transaction from the legacy POS device, inject a location identifier into the transaction data, and transmit the data augmented with the location identifier to the data archiving system 1030 for archiving and associating with the particular location. The data archiving system 1030 may store this transaction data in a database that includes a location identifier field for each stored transaction. In this way, the system facilities the storage and identification of transaction data for multiple particular locations without requiring that the POS devices at each such location be upgraded with the capability of providing location information.

For example, a particular retail location may be acquired by an entity that operates several retail locations. This entity may wish to archive data generated at all of its retail locations. However, the acquired particular retail location may have legacy equipment that is not capable of communicating with remote systems, such as the data archiving system 1030. This legacy equipment may also not be capable of inserting retail location codes or other information that is useful to the data archiving system operated by the entity. In this example, the entity may insert a data transmission system, such as data transmission system 1001, between a legacy POS device and a legacy printer configured at the acquired particular retail location. This data transmission system may be configured to insert a retail location code and/or other information into data received from the legacy POS device and transmit the augmented data to a remote system for archiving. In this way, the entity may archive data generated at the acquired particular retail location without going through the expense of upgrading the legacy equipment at the location.

In various embodiments, the data transmission system 1001 may also, or instead, generate data and transmit the generated data to the data archiving system 1030. This generated data may include data generated based on the data received from the POS device 1005 and/or data representing a modified version of such received data. For example, as described herein, the data transmission system 1001 may use data received from the POS device 1005 to generate data intended for transmission to the printer 1006 (e.g., QR code, other scannable indicia, a message, etc.). The data transmission system 1001 may also, or instead, modify the data received from the POS device 1005 to generate data intended for transmission to the printer 1006 (e.g., one or more coupons, customized messages, data to add emphasis to particular items and/or amounts, etc.). The data transmission system 1001 may transmit this generated and/or modified data to the data archiving system 1030 in addition to, or instead of, transmitting such generated and/or modified data to the printer 1006. The data transmission system 1001 may transmit this generated and/or modified data with or without raw data received from the POS device 1005 and/or any additional data.

In various embodiments, the data transmission system 1001 may also, or instead, transmit payment data to the data archiving system 1030. This payment data may include data received from a payment processing system 1040 and/or data generated by the data transmission system 1001 based on data received from the payment processing system 1040. For example, as described in more detail below, the data transmission system 1001 may use data received from the POS device 1005 to generate a request for payment information that the data transmission system 1001 transmits to the payment processing system 1040. The payment processing system 1040 may transmit the requested payment information to the data transmission system 1001 in response to the request. Along with using this payment information to generate data intended for transmission to the printer 1006 (e.g., a QR code or other scannable indicia, payment instructions, etc.), the data transmission system 1001 may also (or instead) transmit this payment information and/or the payment data generated for transmission to the printer 1006 to the data archiving system 1030. The data transmission system 1001 may also, or instead, transmit the generated request for payment information to the data archiving system 1030. The data transmission system 1001 may transmit this payment information request, payment information, and/or payment data to the data archiving system 1030 with or without any of the other data described herein, such as raw data received from the POS device 1005, additional data, modified data, and/or other generated data.

In particular embodiments, the data transmission system 1001 may provide any of the data transmitted to the data archiving system 1030, or any portion thereof, to the printer 1006 (or one or more other devices) for generating a receipt or other document as described herein. Alternatively, the data transmission system 1001 may not provide such data to the printer 1006. For example, the data transmission system 1001 may be configured to operate as a dedicated archiving component, providing data for archiving to the data archiving system 1030 without transmitting data to a printer or any other device.

In particular embodiments, the data archiving system 1030 may also, or instead, receive data from the payment processing system 1040 that may then be archived at the data archiving system 1030. For example, completed transaction data may be received from the payment processing system 1040 for storage at the data archiving system 1030 (e.g., including tip amounts, tax subtotals, confirmation of payment, payment type, etc.).

The data archived by the data archiving system 1030 may be retrieved, processed, modified, etc. as desired by one or more other remote systems, such as one or more user computing devices 1020. For example, the one or more user computing devices 1020 may be configured to use the data stored by the data archiving system 1030 to generate one or more sales reports and/or shift reports, perform sales and/or performance analysis, etc., for one or multiple locations (e.g., retail locations).

In particular embodiments, the data archiving system 1030 may provide an application programming interface (API) to allow other devices to access the archived data that, for example, has been provided to the data archiving system 1030 by the data transmission system 1001 and/or the data transmission system 1091. For example, the data archiving system 1030 may store received data transmission system data in a database managed by software executing on the data archiving system 1030 that organizes and provides access to such stored data. The data archiving system 1030 may organize this data into one or more data structures that can be stored as part of the database, indexed, and searched.

In particular embodiments, the data archiving system 1030 may parse the data received from the data transmission system 1001 to determine particular values and/or value types in such data. The data archiving system 1030 may then store the values in appropriate fields in a data structure associated with a particular set of data received from the data transmission system 1001. Alternatively, or in addition, the data transmission system 1001 may have received and/or determined value types for particular pieces of data and included indicators of the value types along with that data that it has transmitted to the data archiving system 1030. The data archiving system 1030 may store the values included in such data in fields in a data structure based on the respective value types indicated in the data received from the data transmission system 1001.

For example, the data archiving system 1030 may receive transaction data from the data transmission system 1001 for a particular transaction. In response to recognizing this data as transaction data for a particular transaction, the data archiving system 1030 may generate a data structure for the particular transaction. The data archiving system 1030 may parse the received transaction data to determine particular values for particular types of transaction data, such as a total sale amount, an amount of sales tax, an amount of the sale associated with alcohol, an amount of the sale associated with food, a tip amount, a store location, etc. The data archiving system 1030 may then assign the particular values for particular types of transaction data to the corresponding fields of the data structure for that particular transaction. The data archiving system 1030 may store or otherwise associate the data structure with a database of data transmission system data (e.g., associated with a particular location, a particular entity, etc.) for future use.

The data archiving system 1030 may provide an API that allows a remote device to access data from such a database. The API may allow a remote device to retrieve, search, modify, store, and/or delete data in the database. For example, the one or more user computing devices 1020 may interact with the data archiving system 1030 using such an API to retrieve data for analysis and/or processing by the one or more user computing devices 1020. In particular examples, the one or more user computing devices 1020 may retrieve data from the data archiving system 1030 via an API to generate and/or auto-populate reports (e.g., expense reports, sales reports, etc.), generate support data (e.g., for financial disclosures, tax filings, loans documentation, etc.), and/or perform any other suitable processing of data that may be received from a data transmission system.

Enhanced Business Management and Inventory Control Using a Data Transmission System In various embodiments, the data transmission system 1001 may take one or more actions to facilitate the use of data for enhanced business management and inventory control. The data transmission system 1001 may transmit any of the data that it receives, transmits, generates, and/or processes (e.g., according to any of the embodiments set forth herein) to a business management system 1050. In particular embodiments, the data transmission system 1001 may also provide any portion of such data to the printer 1006 or one or more other devices for generating a receipt or other document as described herein. Alternatively, the data transmission system 1001 may not provide such data to the printer 1006. For example, the data transmission system 1001 may be configured to operate as a dedicated business management system component, providing data for enhanced business management and inventory control to the business management system 1050 without transmitting data to a printer or any other device.

The data received by the business management system 1050 from the data transmission system 1001 may be retrieved, processed, modified, etc. as desired by one or more other remote systems, such as one or more user computing devices 1020. For example, a user may use the data stored by the business management system 1050 to determine sales (e.g., gross, net, etc.), costs (inventory costs, payroll costs, etc.), generate sales reports and/or shift reports, perform sales and/or performance analysis, etc., for one or multiple locations (e.g., retail locations). The data transmission system 1001 may also, or alternatively, provide data that the business management system 1050 may use to determine customer information, such as numbers of new customers, numbers of returning customers, specific customers patronizing a location, types of customers, tips left by specific customers, average tips left by customers in general, ranking of popularity of products and/or services sold, preferred payment methods, etc. The data transmission system 1001 may also, or alternatively, provide data that the business management system 1050 may use to determine inventory information, such as particular items sold and/or quantities of such items sold, particular items remaining in inventory and/or quantities of such items remining in inventory, length of time that particular items have been in inventory and/or quantities of such items, etc.

In particular embodiments, the data archiving system 1030 may also, or instead, receive data from the payment processing system 1040 that may then be stored and accessed at the business management system 1050. For example, completed transaction data may be received from the payment processing system 1040 for storage at the business management system 1050 (e.g., including tip amounts, tax subtotals, confirmation of payment, payment type, etc.).

In particular embodiments, the business management system 1050 may provide an API to allow other devices to access the data that, for example, was provided to the business management system 1050 by the data transmission system 1001 and/or the data transmission system 1091. For example, the business management system 1050 may store received data transmission system data in a database managed by software executing on the business management system 1050 that organizes and provides access to such stored data. The business management system 1050 may organize this data into one or more data structures that can be stored as part of the database, indexed, and searched.

In particular embodiments, the business management system 1050 may parse the data received from the data transmission system 1001 to determine particular values and value types in such data. The business management system 1050 may then store the values in appropriate fields in a data structure associated with a particular set of data received from the data transmission system 1001. Alternatively, or in addition, the data transmission system 1001 may have received and/or determined value types for particular pieces of data and included indicators of the value types along with that data that it has transmitted to the business management system 1050. The business management system 1050 may store the values included in such data in fields in a data structure based on the respective value types indicated in the data received from the data transmission system 1001.

For example, the business management system 1050 may receive transaction data from the data transmission system 1001 for a particular transaction. In response to recognizing this data as transaction data for a particular transaction, the business management system 1050 may generate a data structure for the particular transaction. The business management system 1050 may parse the received transaction data to determine particular values for particular types of transaction data, such as a total sale amount, an amount of sales tax, a tip amount, an amount of the sale associated with alcohol, an amount of the sale associated with food, a quantity of an item sold, a quantity of an item remaining in inventory, a location associated with the transaction, a customer associated with the transaction, a type of customer associated with the transaction, a payment method used in the transaction, etc. The business management system 1050 may then assign the respective particular values for particular types of transaction data to the corresponding respective fields of the data structure for that particular transaction. The business management system 1050 may store or otherwise associate the data structure with a database of data transmission system data for future use.

The API provided by the business management system 1050 may allow a remote device to access data from the database. The API may allow such a remote device to retrieve, search, modify, store, and/or delete data in the database. For example, the one or more user computing devices 1020 may interact with the business management system 1050 using such an API to retrieve data for analysis and/or processing by the one or more user computing devices 1020. In particular examples, the one or more user computing devices 1020 may retrieve data from the business management system 1050 via an API to generate inventory reports, automatically generate orders for items using inventory information determined based on the data, determine advertising targets based on the types of customers reflected in the data, generate sales reports for particular locations, generate payment reports for particular locations, etc.

Consumer Behavior Analysis Using a Data Transmission System

In various embodiments, the data transmission system 1001 may take one or more actions to facilitate the use of data for consumer behavior analysis. The data transmission system 1001 may transmit any of the data that it receives, transmits, generates, and/or processes (e.g., according to any of the embodiments set forth herein) to a consumer data collection system 1060. In particular embodiments, the data transmission system 1001 may also provide any portion of such data to the printer 1006 for generating a receipt or other document as described herein. Alternatively, the data transmission system 1001 may not provide such data to the printer 1006. For example, the data transmission system 1001 may be configured to operate as a dedicated consumer behavior analysis system component, providing data for consumer behavior analysis to the consumer data collection system 1060 without transmitting data to a printer or any other local device.

The data received by the consumer data collection system 1060 from the data transmission system 1001 may be retrieved, processed, modified, etc. as desired by one or more other remote systems, such as one or more user computing devices 1020. For example, a user may use the data stored by the consumer data collection system 1060 to determine sales (e.g., generally or for particular items) in a particular location, compare sales (e.g., generally or for particular items) in multiple locations, determine types of sales in one or more locations (e.g., in person, delivery, take-out, drive-through, etc.), etc. The consumer data collection system 1060 may receive data from multiple data transmission systems allowing it to collect data from multiple locations (e.g., multiple geographically distinct locations). For example, the consumer data collection system 1060 may receive data from both the data transmission system 1001 and the data transmission system 1091 and may make such data available via API to a user of the one or more computing devices 1020. The user may then use such data to determine which geographical locations sell more or less of particular items than others, which locations have comparatively more walk-in customers than others, which have comparatively more delivery customers, etc.

In particular embodiments, the consumer data collection system 1060 may also, or instead, receive data from the payment processing system 1040 that may then be stored and accessed at the consumer data collection system 1060. For example, completed transaction data may be received from the payment processing system 1040 for storage at the consumer data collection system 1060 (e.g., including tip amounts, tax subtotals, confirmation of payment, payment type, etc.).

In particular embodiments, the business management system 1050 may provide an API to allow other devices to access the data that, for example, was provided to the consumer data collection system 1060 by the data transmission system 1001 and/or the data transmission system 1091. For example, the consumer data collection system 1060 may store received data transmission system data in a database managed by software executing on the consumer data collection system 1060 that organizes and provides access to such stored data. The consumer data collection system 1060 may organize this data into one or more data structures that can be stored as part of the database, indexed, and searched.

In particular embodiments, the consumer data collection system 1060 may parse the data received from the data transmission system 1001 to determine particular values and value types in such data. The consumer data collection system 1060 may then store the values in appropriate fields in a data structure associated with a particular set of data received from the data transmission system 1001. Alternatively, or in addition, the data transmission system 1001 may have received and/or determined value types for particular pieces of data and included indicators of the value types along with that data that it has transmitted to the consumer data collection system 1060. The consumer data collection system 1060 may store the values included in such data in fields in a data structure based on the respective value types indicated in the data received from the data transmission system 1001.

For example, the consumer data collection system 1060 may receive transaction data from the data transmission system 1001 for a particular transaction. In response to recognizing this data as transaction data for a particular transaction, the consumer data collection system 1060 may generate a data structure for the particular transaction. The consumer data collection system 1060 may parse the received transaction data to determine particular values for particular types of transaction data, such as a particular item sold, a particular location where the item was sold, a particular method of receiving the item (e.g., delivery, take-out, in-person, etc.), a particular method of payment, a coupon used with purchase, etc. The consumer data collection system 1060 may then assign the particular values for particular types of transaction data to the corresponding fields of the data structure for that particular transaction. The consumer data collection system 1060 may store or otherwise associate the data structure with a database of data transmission system data for future use.

The API provided by the consumer data collection system 1060 may allow a remote device to access data from the database. The API may allow such a remote device to retrieve, search, modify, store, and/or delete data in the database. For example, the one or more user computing devices 1020 may interact with the consumer data collection system 1060 using such an API to retrieve data for analysis and/or processing by the one or more user computing devices 1020. In particular examples, the one or more user computing devices 1020 may retrieve data from the consumer data collection system 1060 via an API to generate marketing material or advertising for particular locations, coupons for particular items, locations, and/or customers, promotions for particular methods of receiving items (e.g., delivery, take-out, in-person, etc.), etc. In particular embodiments, the one or more user computing devices 1020 and/or the consumer data collection system 1060 may use artificial intelligence (AI) and/or machine learning to analyze the consumer-related data stored at the consumer data collection system 1060 and automatically determine targeted marketing materials and/or strategies for particular geographical locations or regions.

Exemplary Remote System Data Storage Process

FIG. 11 illustrates an example Remote System Data Storage Process 1100 that may be performed by a data transmission system, such as any one or more of the data transmission systems 600, 1001, and 1091, according to various embodiments. In performing the Remote System Data Storage Process 1100, the system begins at Step 1110 by a data transmission system receiving a signal containing data (e.g., transaction data) transmitted by a source device. The source device may be a physically connected device (e.g., POS, cash register, computer, smartphone, etc.) or a wirelessly connected device (e.g., a remote system communicating with the data transmission system using wireless communications components).

At Step 1120, the system may determine whether to augment the received (e.g., "raw") data with any additional information (e.g., one or more identifiers and/or other types of information). If the system determines that the raw data is to be supplemented with additional data, at Step 1130 the system determines this additional data and inserts the additional data into the raw data or otherwise augments the raw data with the additional data. If the system determines that the raw data is not to be supplemented with additional data, the process moves to Step 1140.

At Step 1140, the system may determine whether to generate data, for example, based on the received data (e.g., generate a QR code, coupon, etc. based on received transaction data and/or received payment information) and/or modify the received data. If the system determines to generate data and/or modify the received data, at Step 1150 the system generates data (e.g., based on the received data) and/or modifies the received data. The system then inserts the generated and/or modified data into the data to be sent to one or more remote systems, such as one or more of the data archiving system 1030, the business management system 1050, the consumer data collection system 1060, and/or the payment processing system 1040. In particular embodiments, the system generates data that may be used to facilitate retrieval of the data after storage. For example, the data transmission system may include, in the data sent to a remote system, one or more identifiers, labels, etc. that can be stored in a data structure associated with a particular data set (e.g., transaction data for a particular transaction). As described herein, such data structures can then be searched later to readily identify data associated with a particular data set (e.g., data set associated with a transaction of interest). If the system determines that no data is to be generated and/or the received data is not to be modified, the process moves to Step 1160.

At Step 1160, the system may transmit the data intended for remote storage (e.g., raw data, additional data, generated data, and/or modified data) to one or more remote systems. The system may use any of the communications methods described herein to do so, such as using wireless communications components configured to communicate with a remote system via one or more computer networks.

At Step 1170, the system may determine whether to also transmit the data (e.g., the data intended for remote storage) to a printer or other device. In particular embodiments, the system may be configured to transmit data to a printer for printing a receipt or other paper document that can then be presented to a customer, as described herein. Alternatively, the system may be configured to perform remote storage functions without interacting with a printer or other peripheral device. If the system determines that the data is to be provided to a printer or other device, at Step 1180 the system transmits the data to the printer or other device. After transmitting the data to the printer or other device, or if the system determines that the data is not to be transmitted to a printer or other device, the system may return to Step 1110 to process additional data.

Exemplary Remote System Payment Process

FIG. 12 illustrates an example Remote System Payment Process 1200 that may be performed by one or more data transmission systems, such one or more of the data transmission systems 600, 1001, and/or 1091, according to various embodiments. In performing the Remote System Payment Process 1200, the system begins at Step 1210 by receiving a signal containing data (e.g., transaction data) transmitted by a source device. The source device may be a physically connected device (e.g., POS, cash register, computer, smartphone, etc. as described above) or a wirelessly connected device (e.g., a remote system communicating with the data transmission system using wireless communications components as described above).

At Step 1220, the system may determine whether the ultimate destination for payment information associated with the received data is another, different data transmission system. For example, as noted above, two or more data transmission systems may interoperate such that orders placed using a POS device at a first location connected to a first data transmission system may generate a printed receipt with payment information at a printer attached to a second data transmission system at a second, different location. If, at Step 1220, the system determines that the destination data transmission system is a different system than the system receiving data at Step 1210, at Step 1230 the system may determine information associated with the destination system that may be needed to generate a request for payment information. For example, the system may access a database using information contained in the data received at Step 1210 to determine an identifier for the destination system. Alternatively, the system may be configured to insert a particular identifier or code into all requests for payment information. In another alternative, the system may be configured to identify a code or other data in the data received at Step 1210 and correlate the identified code or data with a particular destination identifier that can then be inserted into a request for payment information.

In particular embodiments, the system may not be configured to determine a destination system and, instead, the destination system may be determined by the payment processing system and/or default to being the same data transmission system. In such embodiments, the process may move from Step 1220 to Step 1240.

At Step 1240, the system may generate a payment information request. This request may include a destination data transmission system identifier if the system determined at Step 1220 that a destination data transmission system may is to be identified in the request. The request may also, or instead, include any other information that may be suitable for requesting payment information from a payment processing system, such as transaction data and/or merchant information. At Step 1250, the system may transmit the payment information request to a payment processing system. In particular embodiments, the system may also transmit the payment information request and/or any other data that the system has received, generated, and/or modified to one or more other remote systems as described in various embodiments herein.

At Step 1260, the system may receive payment information from the payment processing system that the payment processing system generated in response to the request sent at Step 1250. At Step 1270, the system may generate any data to be provided to a printer (e.g., any other typical receipt information, transaction data, messages, coupons, etc.) and the payment information and transmit such data and information to the printer to be printed on a receipt or other document and presented to the customer for payment. In particular embodiments, the system may also transmit some or all of the payment information received from the payment processing system and/or any other data that the system has received, generated, and/or modified to one or more other remote systems as described in various embodiments herein.

It is noted that when the destination data transmission system is determined to be a different system (e.g., at Step 1220), the payment processing system may transmit the payment information to that different system. In such embodiments, Steps 1260 and 1270 may be executed at that different destination data transmission system.

Example Payment Facilitation Using a Data Transmission System

A particular use case will now be discussed in the context of facilitating payments at restaurants, and for monitoring/tracking sales and payment activity at various restaurants using one or more data transmission systems according to a particular embodiment where a data transmission device is being used in place of a standard cable that extends between a legacy POS device and a legacy printer (e.g., where neither of which has the capability to process payments via a wireless device). In the following example, reference will be made to the exemplary devices and components described above as well as the example receipt and user interfaces illustrated in FIGS. 13-16.

In this example, a restaurant owner may configure a system by replacing a standard printer cable extending between the restaurant's legacy POS system and its legacy printer with a smart cable that may be a data transmission system such as those described herein (e.g., in regard to the data transmission system 1001 of FIG. 10). This example smart cable may take the form of an elongated cord having an integrated housing containing one or more of the components of a data transmission system as described herein (e.g., data transmission system 600, 700, 800, 1001, 1091). The respective ends of the smart cable may include one or more connectors, adapters, etc. (e.g., as described herein). This smart cable may, for example, take the form of any suitable embodiment described above.

In this example, a customer may place an order for food at the restaurant (e.g., in person, by calling in the order, placing the order online, etc.). In response to receiving the order, a restaurant worker may enter the order into a POS device (e.g., the POS device 1005), which then generates transaction data that includes, for example, a description of each item in the individual's order (e.g., sashimi, a sampler, a drink, etc.) and a corresponding price for each item. The POS device may also calculate any additional charges, such as sales tax, that apply to the transaction. After the transaction information is complete, the restaurant worker may press a particular button on the POS device to complete the transaction. At least partially in response to detecting the press of this button, the POS device transmits the information for the transaction (i.e., the transaction information intended for a receipt printer) into the smart cable. This information arrives at the smart cable and is provided to the processing components of the cable and processed as described herein.

If the smart cable has sufficient power and is connected to a suitable network (e.g., a local wireless network that is connected to the Internet), the wireless communications components of the cable transmit the transaction data (e.g., as received, generated by the processing components, etc.) to one or more remote systems (e.g., with a request for payment information). In this example, the cable may transmit the transaction data to: (1) a data archiving system; (2) a business management system; (3) a consumer data collection system; and/or (4) a payment processing system (see, e.g., FIG. 10 and the systems represented therein) for use by those respective systems (e.g., as described above). It should be understood that while, in this example and other examples provided elsewhere herein, the respective functionality of such remote systems are shown as being executed by separate computing systems (e.g., separate servers), in other embodiments, the functionality of these various systems (e.g., the Data Archiving System 1030, Payment Processing System 1040, Business Management System 1050, Consumer Data Collection System 1060) may be implemented by fewer than four individual computing systems (e.g., on a single server running a single software application).

As noted above, in response to receiving the transaction data, the data archiving system may parse the transaction data and store the data into a particular data structure for later retrieval (e.g., via a suitable API) and use (e.g., by the business that is involved in the transaction). For example, the transaction data may be used in the context of a tax audit or in any other suitable context. Similarly, the business management system and/or the consumer data collection system may also, or instead, parse this transaction data and store the data into a particular data structure for later retrieval (e.g., via a suitable API) and use, as described herein.

Continuing with the restaurant purchase example, in response to receiving the transaction data, the payment processing system may facilitate a mobile payment (or other touchless or non-touchless payment) for the transaction. For example, at least partially in response to receiving the transaction data (e.g., within a request for payment information), the payment processing system may analyze the data to identify each item within the transaction and the respective price for each item. The payment processing system may then pass the analyzed data to an external payment processing server that is configured to accept mobile and/or non-mobile methods of payment such as Apple Pay, PayPal, Google Pay, or manual entry of credit card information. This external payment processing server may generate a unique URL as described above and provide the URL and/or information associated with the URL (e.g., a QR code representing the URL) to the payment processing system which then transmits that information the smart cable. The smart cable may in turn transmit this information to a printer as receipt data for printing on a receipt. In particular embodiments, the smart cable may process the information received from the payment processing system as described herein to generate suitable receipt data for the destination printer or other device.

Figure 13:
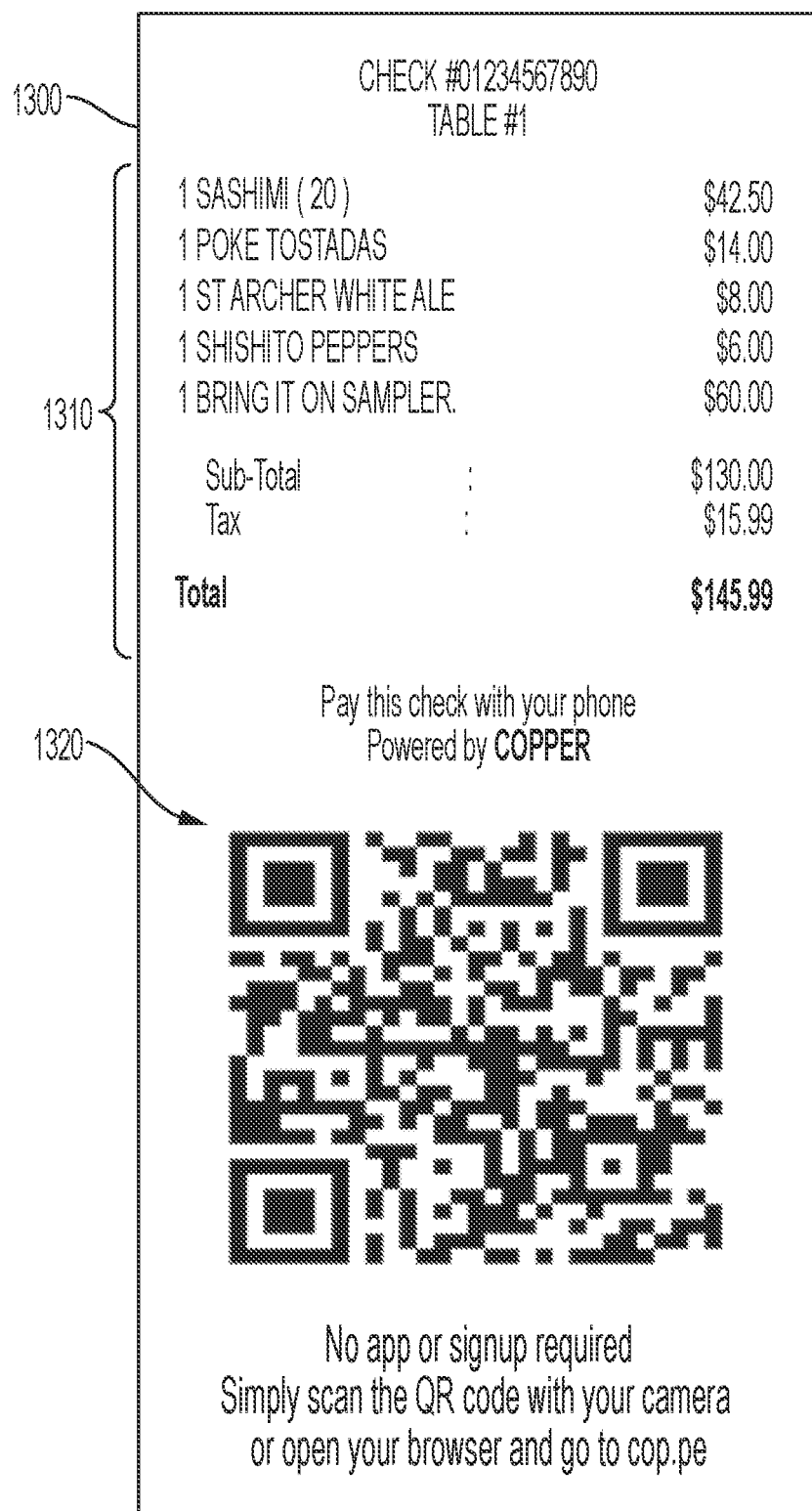
FIG. 13 is an illustration of an exemplary receipt according to various embodiments.

Referring now to FIG. 13, in response to receiving the receipt data from the smart cable, the printer may print a receipt 1300. The receipt 1300 may include transaction data 1310 (e.g., that may reflect the data received from a POS device) as well as augmented data, such as a QR code 1320 that will allow a customer to provide a payment for the transaction using a mobile device.

Figure 14:
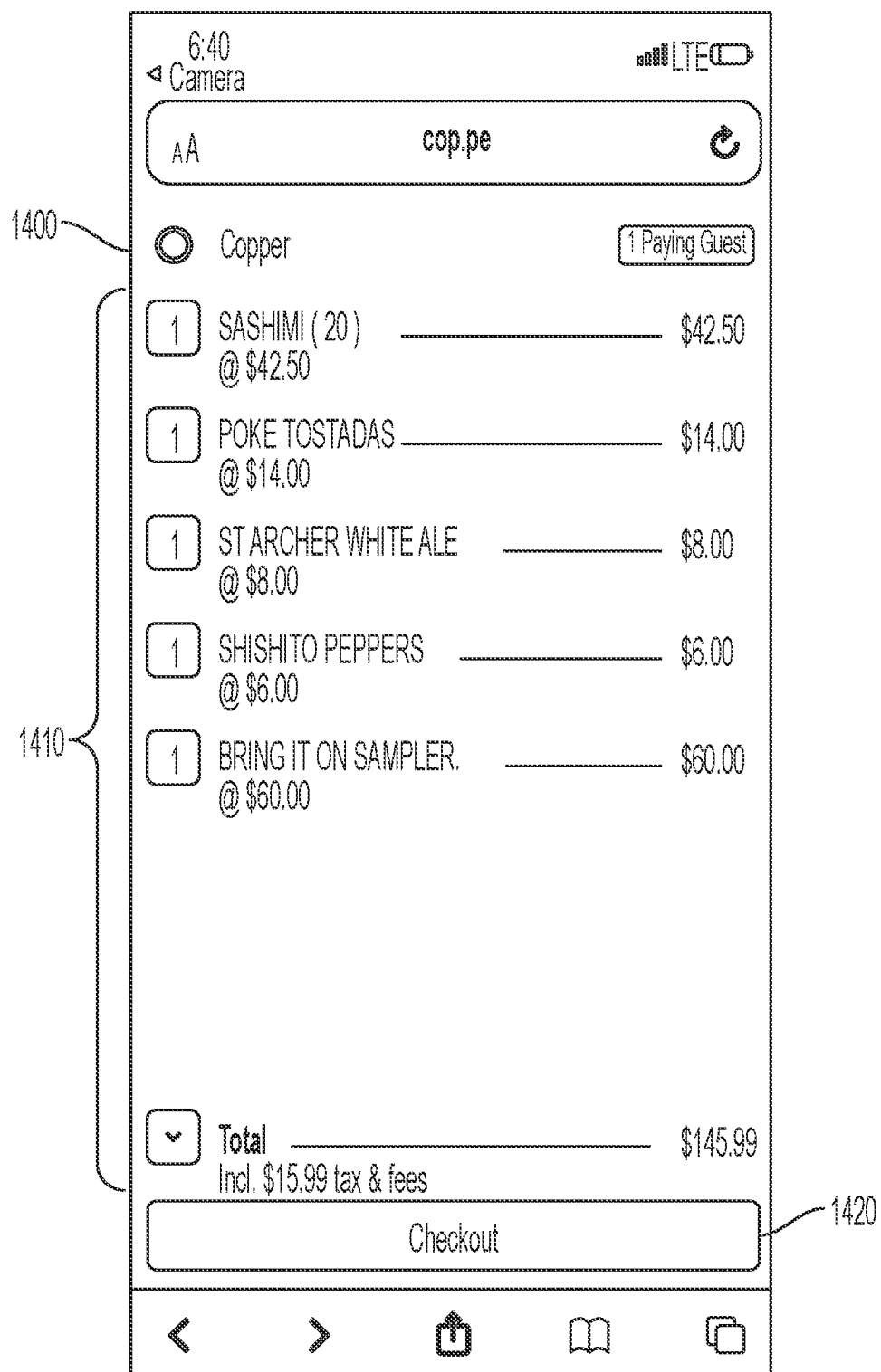
FIGS. 14-16 are illustrations of various exemplary user interfaces according to various embodiments.

In response to scanning the QR code 1320, the customer's mobile device may be directed to a unique payment URL that may link to a unique transaction webpage that may be generated by an external payment processing system (e.g., the external payment processing system 1045 of FIG. 10). Referring now to FIG. 14, this unique payment URL may include a user interface 1400 that provides a listing of the transaction data 1410 and a control 1420 that allows the customer to begin the payment process.

Figure 15:
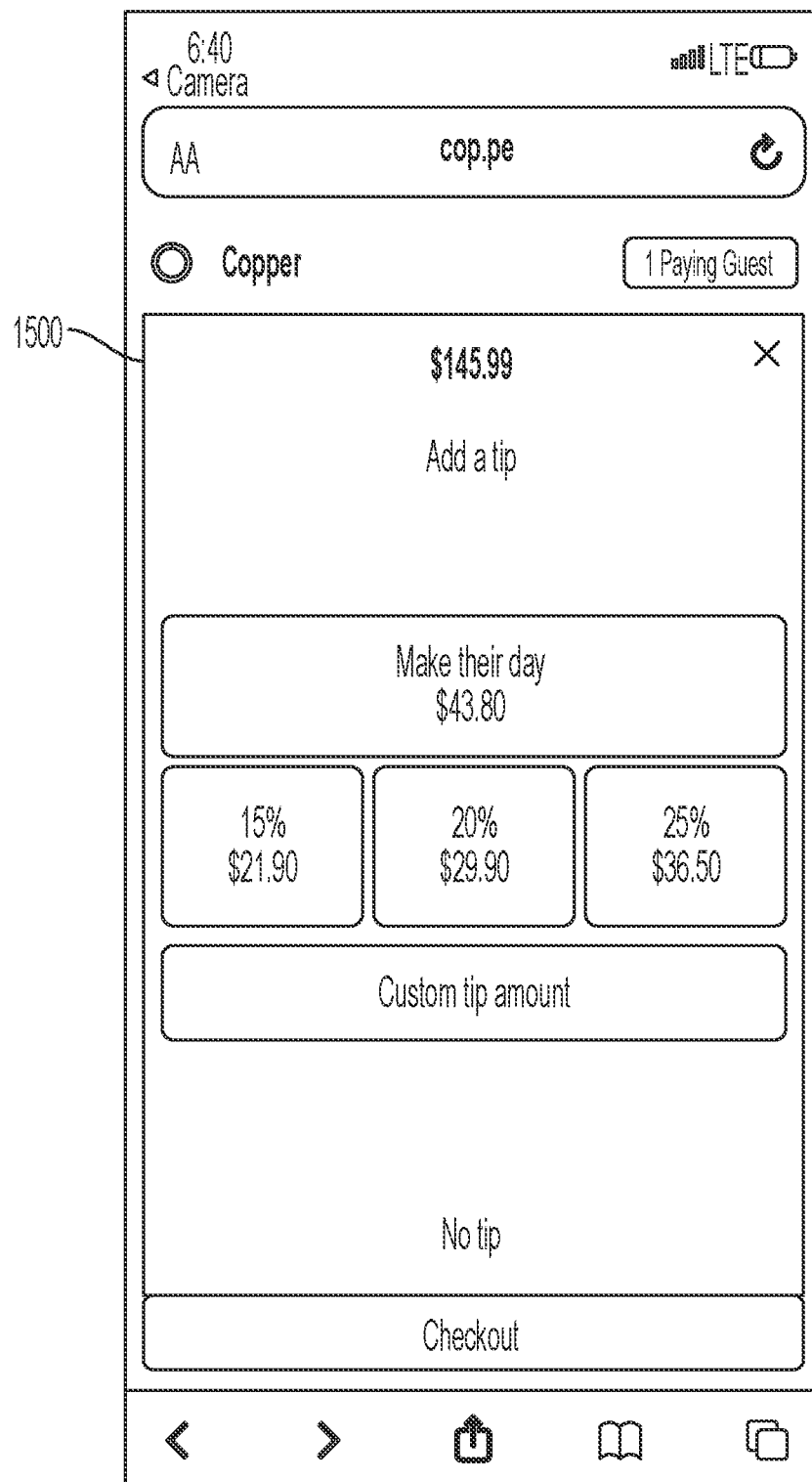
Figure 16:
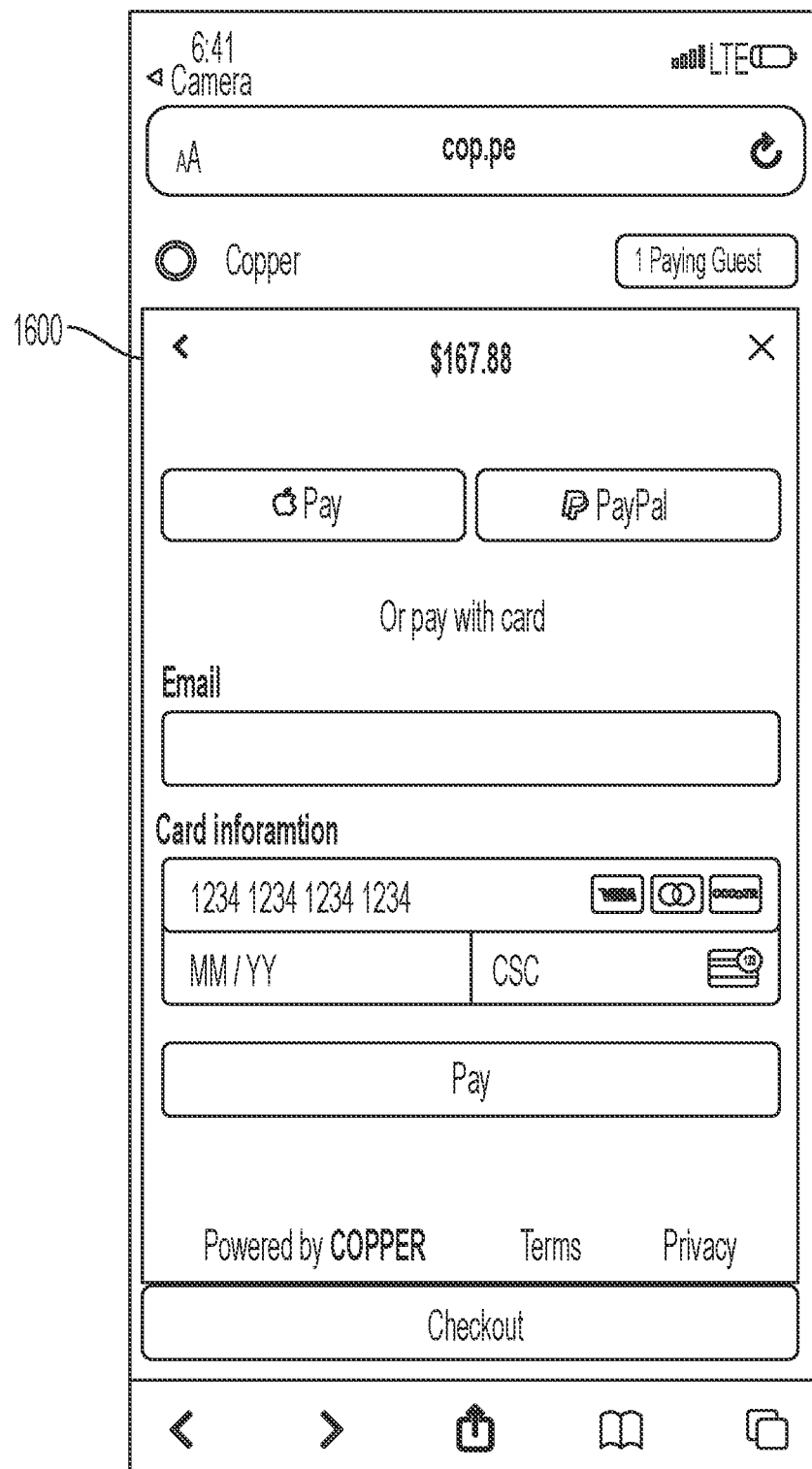

In response to the activation by the customer of the control 1420, the customer's mobile device may be directed to another user interface that allows the customer to specify a tip amount. Referring now to FIG. 15, the user interface 1500 may allow a user to select a predetermined tip amount, no tip, or enter a custom tip amount. In response to receiving an indication from the customer of a tip amount, the customer's mobile device may then present a final payment user interface 1600 as shown in FIG. 16. Via user interface 1600, the customer may choose a mobile payment mechanism (e.g., Apple Pay, PayPal) or enter credit card information to complete the transaction.

Example Remote Kitchen Order Processing Using Data Transmission Systems

A particular use case will now be discussed in the context of facilitating the fulfillment of food orders using separate locations for receiving orders and filling orders. As will be appreciated, the practice of obtaining restaurant meals via delivery and take-out has increased dramatically recently. In various embodiments, the disclosed data transmission systems may be used to facilitate communications regarding food orders between multiple locations. For example, food delivery orders may be received at a central location and then provided to one of several possible other locations that each may be physically separate from the central location. In the following example, reference will be made to the exemplary devices and components described above.

A data transmission system (e.g., the data transmission system 1001 of FIG. 10) may be configured at a central location that receives food orders for delivery. The data transmission system may receive order data from a POS device (e.g., the POS device 1005 of FIG. 10) and transmit the order data to a remote system for processing. The data transmission system at the central location may modify and/or augment the order data as described herein or may send the order data unchanged as received from the POS device (as "raw" data) using its wireless communications components. The remote system (e.g., the payment processing system 1040, the business management system 1050, etc.) may select an appropriate destination remote system for the order. In particular embodiments, the remote system may select an appropriate destination system based on the order data. For example, the order data may include an identifier of a destination system or the data transmission system may augment the order data with an identifier of a destination system. In particular embodiments, the remote system may be configured to determine an appropriate destination system based on various criteria, such as a location of the customer (e.g., that may be included in the order data), the ability of one or more of various destination kitchens to timely fulfill the order, etc.

Alternatively, or in addition, a customer may generate order data by interacting with a website using the customer's device (e.g., smart phone, computer, tablet, etc.). This website may transmit the order data to a remote system for processing. The website may modify and/or augment the order data as described herein or may send the order data unchanged as received from customer via the website (as "raw" data). The remote system (e.g., the payment processing system 1040, the business management system 1050, etc.) may select an appropriate destination remote system for the order. In particular embodiments, the remote system may select an appropriate destination system based on the order data. For example, the order data may include an identifier of a destination system or the data transmission system may augment the order data with an identifier of a destination system. In particular embodiments, the remote system may be configured to determine an appropriate destination system based on various criteria, such as a location of the customer (e.g., that may be included in the order data, determined by the website, etc.), the ability of one or more of various destination kitchens to timely fulfill the order, etc.

In particular embodiments, the destination remote system may be another data transmission system (e.g., the data transmission system 1091 of FIG. 10) that may then send the order data to a printer (e.g., the printer 1096 of FIG. 10) for printing out as an order that can be prepared at the location at which the destination data transmission system is located. Alternatively, the destination remote system may be any other type of device, such as a computing device with a display, that conveys the order information to one or more employees at the location of the destination remote system for preparation.

CONCLUSION

Although embodiments above are described in reference to various data transmission systems, it should be understood that various aspects of the system described above may be applicable to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and initially claimed as such, one or more features from a claimed combination may in some cases be excised from the combination, and the claimed combination may be directed to a sub-combination or variation of a sub-combination.

Similarly, while operations may be described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A data transmission system configured to modify data transmitted from a source device to a destination device, the data transmission system comprising:
  a first adapter comprising one or more first connectors and one or more first serial communications outputs, wherein the first adapter is configured to:
    receive a first signal comprising initial data from the source device at the one or more first connectors; and
    transmit a second signal comprising the initial data via the one or more serial communications outputs to a first multiplexer;
  the first multiplexer configured to:
    receive the second signal from the first adapter;
    determine whether to transmit the second signal to a second multiplexer; and
    at least partially in response to determining to transmit the second signal to the second multiplexer, transmit the second signal to the second multiplexer;
  the second multiplexer configured to:
    receive the second signal from the first multiplexer;
    transmit the second signal to a processing component;
    receive a third signal from the processing component; and
    transmit the third signal to a second adapter;
  the processing component comprising one or more processors, data storage, one or more first serial communications inputs, and one or more second serial communications outputs, wherein the processing component is configured to:
    receive the second signal from the second multiplexer at the one or more first serial communications inputs;
    extract the initial data from the second signal;
    determine one or more modifications of the initial data based at least in part on the initial data;
    generate modified data based at least in part on the one or more modifications;
    generate the third signal comprising the modified data; and
    transmit the third signal via the one or more second serial communications outputs to the second multiplexer; and
  the second adapter comprising one or more second connectors and one or more second serial communications inputs, wherein the second adapter is configured to:
    receive the third signal comprising the modified data from the second multiplexer at the one or more second serial communications inputs; and
    transmit a fourth signal comprising the modified data via the one or more second connectors to the destination device, wherein:
  the modified data comprises the initial data; and
  the processing component is configured to generate the modified data by augmenting the initial data with additional data.

2. A data transmission system configured to modify data transmitted from a source device to a destination device, the data transmission system comprising:
  a first adapter comprising one or more first connectors and one or more first serial communications outputs, wherein the first adapter is configured to:
    receive a first signal comprising initial data from the source device at the one or more first connectors; and
    transmit a second signal comprising the initial data via the one or more serial communications outputs to a first multiplexer;

the first multiplexer configured to:
  receive the second signal from the first adapter;
  determine whether to transmit the second signal to a second multiplexer; and
  at least partially in response to determining to transmit the second signal to the second multiplexer, transmit the second signal to the second multiplexer;
the second multiplexer configured to:
  receive the second signal from the first multiplexer;
  transmit the second signal to a processing component;
  receive a third signal from the processing component; and
  transmit the third signal to a second adapter;
the processing component comprising one or more processors, data storage, one or more first serial communications inputs, and one or more second serial communications outputs, wherein the processing component is configured to:
  receive the second signal from the second multiplexer at the one or more first serial communications inputs;
  extract the initial data from the second signal;
  determine one or more modifications of the initial data based at least in part on the initial data;
  generate modified data based at least in part on the one or more modifications;
  generate the third signal comprising the modified data; and
  transmit the third signal via the one or more second serial communications outputs to the second multiplexer; and
the second adapter comprising one or more second connectors and one or more second serial communications inputs, wherein the second adapter is configured to:
  receive the third signal comprising the modified data from the second multiplexer at the one or more second serial communications inputs; and
  transmit a fourth signal comprising the modified data via the one or more second connectors to the destination device,
wherein the processing component is configured to generate the modified data by altering the initial data.

3. A data transmission system configured to modify data transmitted from a source device to a destination device, the data transmission system comprising:
a first adapter comprising one or more first connectors and one or more first serial communications outputs, wherein the first adapter is configured to:
  receive a first signal comprising initial data from the source device at the one or more first connectors; and
  transmit a second signal comprising the initial data via the one or more serial communications outputs to a first multiplexer;
the first multiplexer configured to:
  receive the second signal from the first adapter;
  determine whether to transmit the second signal to a second multiplexer; and
  at least partially in response to determining to transmit the second signal to the second multiplexer, transmit the second signal to the second multiplexer;
the second multiplexer configured to:
  receive the second signal from the first multiplexer;
  transmit the second signal to a processing component;
  receive a third signal from the processing component; and
  transmit the third signal to a second adapter;
the processing component comprising one or more processors, data storage, one or more first serial communications inputs, and one or more second serial communications outputs, wherein the processing component is configured to:
  receive the second signal from the second multiplexer at the one or more first serial communications inputs;
  extract the initial data from the second signal;
  determine one or more modifications of the initial data based at least in part on the initial data;
  generate modified data based at least in part on the one or more modifications;
  generate the third signal comprising the modified data; and
  transmit the third signal via the one or more second serial communications outputs to the second multiplexer; and
the second adapter comprising one or more second connectors and one or more second serial communications inputs, wherein the second adapter is configured to:
  receive the third signal comprising the modified data from the second multiplexer at the one or more second serial communications inputs; and
  transmit a fourth signal comprising the modified data via the one or more second connectors to the destination device, wherein:
none of the one or more first connectors of the first adapter are a universal asynchronous receiver-transmitter (UART) connector or a universal serial bus (USB) connector;
each of the one or more first serial communications outputs is a UART output or a USB output; and
the first adapter is further configured to convert the first signal to the second signal, wherein the second signal is one of a UART signal and a USB signal.

4. A data transmission system configured to modify data transmitted from a source device to a destination device, the data transmission system comprising:
a first adapter comprising one or more first connectors and one or more first serial communications outputs, wherein the first adapter is configured to:
  receive a first signal comprising initial data from the source device at the one or more first connectors; and
  transmit a second signal comprising the initial data via the one or more serial communications outputs to a first multiplexer;
the first multiplexer configured to:
  receive the second signal from the first adapter;
  determine whether to transmit the second signal to a second multiplexer; and
  at least partially in response to determining to transmit the second signal to the second multiplexer, transmit the second signal to the second multiplexer;
the second multiplexer configured to:
  receive the second signal from the first multiplexer;
  transmit the second signal to a processing component;
  receive a third signal from the processing component; and
  transmit the third signal to a second adapter;
the processing component comprising one or more processors, data storage, one or more first serial communications inputs, and one or more second serial communications outputs, wherein the processing component is configured to:
  receive the second signal from the second multiplexer at the one or more first serial communications inputs;
  extract the initial data from the second signal;
  determine one or more modifications of the initial data based at least in part on the initial data;

generate modified data based at least in part on the one or more modifications;
generate the third signal comprising the modified data; and
transmit the third signal via the one or more second serial communications outputs to the second multiplexer; and the second adapter comprising one or more second connectors and one or more second serial communications inputs, wherein the second adapter is configured to:
receive the third signal comprising the modified data from the second multiplexer at the one or more second serial communications inputs; and
transmit a fourth signal comprising the modified data via the one or more second connectors to the destination device, wherein:

the one or more first connectors of the first adapter comprise a universal serial bus (USB) connector;
the first adapter is further configured to relay the first signal from the USB connector to one or more of the one or more serial communications outputs.

5. A data transmission system configured to modify data transmitted from a source device to a destination device, the data transmission system comprising:
a first adapter comprising one or more first connectors and one or more first serial communications outputs, wherein the first adapter is configured to:
receive a first signal comprising initial data from the source device at the one or more first connectors; and
transmit a second signal comprising the initial data via the one or more serial communications outputs to a first multiplexer;
the first multiplexer configured to:
receive the second signal from the first adapter;
determine whether to transmit the second signal to a second multiplexer; and
at least partially in response to determining to transmit the second signal to the second multiplexer, transmit the second signal to the second multiplexer;
the second multiplexer configured to:
receive the second signal from the first multiplexer;
transmit the second signal to a processing component;
receive a third signal from the processing component; and
transmit the third signal to a second adapter;
the processing component comprising one or more processors, data storage, one or more first serial communications inputs, and one or more second serial communications outputs, wherein the processing component is configured to:
receive the second signal from the second multiplexer at the one or more first serial communications inputs;
extract the initial data from the second signal;
determine one or more modifications of the initial data based at least in part on the initial data;
generate modified data based at least in part on the one or more modifications;
generate the third signal comprising the modified data; and
transmit the third signal via the one or more second serial communications outputs to the second multiplexer; and the second adapter comprising one or more second connectors and one or more second serial communications inputs, wherein the second adapter is configured to:
receive the third signal comprising the modified data from the second multiplexer at the one or more second serial communications inputs; and
transmit a fourth signal comprising the modified data via the one or more second connectors to the destination device, wherein:
the one or more first connectors of the first adapter comprise a first single universal serial bus (USB) connector; and
the one or more second connectors of the second adapter comprise a second single USB connector.

6. A data transmission system configured to modify data transmitted from a source device to a destination device, the data transmission system comprising:
a first adapter comprising one or more first connectors and one or more first serial communications outputs, wherein the first adapter is configured to:
receive a first signal comprising initial data from the source device at the one or more first connectors; and
transmit a second signal comprising the initial data via the one or more serial communications outputs to a first multiplexer;
the first multiplexer configured to:
receive the second signal from the first adapter;
determine whether to transmit the second signal to a second multiplexer; and
at least partially in response to determining to transmit the second signal to the second multiplexer, transmit the second signal to the second multiplexer;
the second multiplexer configured to:
receive the second signal from the first multiplexer;
transmit the second signal to a processing component;
receive a third signal from the processing component; and
transmit the third signal to a second adapter;
the processing component comprising one or more processors, data storage, one or more first serial communications inputs, and one or more second serial communications outputs, wherein the processing component is configured to:
receive the second signal from the second multiplexer at the one or more first serial communications inputs;
extract the initial data from the second signal;
determine one or more modifications of the initial data based at least in part on the initial data;
generate modified data based at least in part on the one or more modifications;
generate the third signal comprising the modified data; and
transmit the third signal via the one or more second serial communications outputs to the second multiplexer; and
the second adapter comprising one or more second connectors and one or more second serial communications inputs, wherein the second adapter is configured to:
receive the third signal comprising the modified data from the second multiplexer at the one or more second serial communications inputs; and
transmit a fourth signal comprising the modified data via the one or more second connectors to the destination device; wherein:
the one or more first connectors of the first adapter comprise a first single serial communications connector that is not a universal serial bus (USB) connector; and the one or more second connectors of the second adapter comprise a second single serial communications connector that is not a USB connector.

7. A method of operating a data transmission system, the method comprising:
receiving, at one or more first connectors of a first adapter, a first signal from a source device, the first signal comprising initial data;
transmitting, from one or more serial communications outputs of the first adapter, a second signal to a first multiplexer, the second signal comprising the initial data;
determining, by the first multiplexer, to transmit the second signal to one of:
a second multiplexer for transmission to a processing component, wherein the processing component is configured to generate modified data based at least in part on the initial data; and
a second adapter for transmission to a destination device;
at least partially in response to determining to transmit the second signal to the second adapter for transmission to the destination device, transmitting the second signal from the first multiplexer to one or more serial communications inputs of the second adapter;
receiving, at the one or more serial communications inputs of the second adapter, the second signal;
transmitting, from one or more second connectors of the second adapter, a third signal to the destination device, the third signal comprising the initial data, wherein determining, by the first multiplexer, to transmit the second signal to one of the second multiplexer and the second adapter comprises:
determining, at the first multiplexer, whether a detected level of power meets a threshold level of power; and
at least partially in response to determining that the detected level of power does not meet the threshold level of power, determining to transmit the second signal to the second adapter for transmission to the destination device.

8. A method of operating a data transmission system, the method comprising:
receiving, at one or more first connectors of a first adapter, a first signal from a source device, the first signal comprising initial data;
transmitting, from one or more serial communications outputs of the first adapter, a second signal to a first multiplexer, the second signal comprising the initial data;
determining, by the first multiplexer, to transmit the second signal to one of:
a second multiplexer for transmission to a processing component, wherein the processing component is configured to generate modified data based at least in part on the initial data; and
a second adapter for transmission to a destination device;
at least partially in response to determining to transmit the second signal to the second adapter for transmission to the destination device, transmitting the second signal from the first multiplexer to one or more serial communications inputs of the second adapter;
receiving, at the one or more serial communications inputs of the second adapter, the second signal;
transmitting, from one or more second connectors of the second adapter, a third signal to the destination device, the third signal comprising the initial data, wherein determining, by the first multiplexer, to transmit the second signal to one of the second multiplexer and the second adapter comprises:
determining, at the first multiplexer, whether a detected level of power meets a threshold level of power; and
at least partially in response to determining that the detected level of power meets the threshold level of power, determining to transmit the second signal to the second multiplexer for transmission to the processing component.

9. A method of operating a data transmission system, the method comprising:
receiving, at one or more first connectors of a first adapter, a first signal from a source device, the first signal comprising initial data;
transmitting, from one or more serial communications outputs of the first adapter, a second signal to a first multiplexer, the second signal comprising the initial data;
determining, by the first multiplexer, to transmit the second signal to one of:
a second multiplexer for transmission to a processing component, wherein the processing component is configured to generate modified data based at least in part on the initial data; and
a second adapter for transmission to a destination device;
at least partially in response to determining to transmit the second signal to the second adapter for transmission to the destination device, transmitting the second signal from the first multiplexer to one or more serial communications inputs of the second adapter;
receiving, at the one or more serial communications inputs of the second adapter, the second signal;
transmitting, from one or more second connectors of the second adapter, a third signal to the destination device, the third signal comprising the initial data;
wherein determining, by the first multiplexer, to transmit the second signal to one of the second multiplexer and the second adapter comprises:
receiving a signal from the processing component;
determining, at the first multiplexer, whether a detected level of power meets a threshold level of power; and
at least partially in response to determining that the detected level of power does not meet the threshold level of power, determining to transmit the second signal to the second adapter for transmission to the destination device.

10. The method of claim 9, wherein the signal from the processing component comprises an instruction to transmit the second signal to the second multiplexer.

11. The method of claim 9, wherein the signal from the processing component comprises an instruction to transmit the second signal to the second adapter.

12. A method of operating a data transmission system, the method comprising:
receiving, at one or more first connectors of a first adapter, a first signal from a source device, the first signal comprising initial data;
transmitting, from one or more serial communications outputs of the first adapter, a second signal to a first multiplexer, the second signal comprising the initial data;
determining, by the first multiplexer, to transmit the second signal to one of:
a second multiplexer for transmission to a processing component, wherein the processing component is configured to generate modified data based at least in part on the initial data; and a second adapter for transmission to a destination device;

at least partially in response to determining to transmit the second signal to the second adapter for transmission to the destination device, transmitting the second signal from the first multiplexer to one or more serial communications inputs of the second adapter;

receiving, at the one or more serial communications inputs of the second adapter, the second signal;

transmitting, from one or more second connectors of the second adapter, a third signal to the destination device, the third signal comprising the initial data; wherein:

the first signal is a first communications standard signal;

the second signal is a second communications standard signal;

the first communications standard is different than the second communications standard; and transmitting, from one or more serial communications outputs of the first adapter, the second signal to a first multiplexer comprises converting, at the first adapter, the first communications standard signal to the second communications standard signal.

13. A data transmission system configured to modify data transmitted from a source device to a destination device, the data transmission system comprising:

a first adapter comprising one or more first connectors and one or more first serial communications outputs, wherein the first adapter is configured to:

receive a first signal comprising initial data from the source device at the one or more first connectors; and transmit a second signal comprising the initial data via the one or more serial communications outputs to a first multiplexer;

the first multiplexer configured to:

receive the second signal from the first adapter;

determine to transmit the second signal to one of a second multiplexer and a second adapter;

at least partially in response to determining to transmit the second signal to the second multiplexer, transmit the second signal to the second multiplexer; and at least partially in response to determining to transmit the second signal to the second adapter, transmit the second signal to the second adapter;

the second multiplexer configured to:

receive the second signal from the first multiplexer;

transmit the second signal to a processing component;

receive a third signal from the processing component; and transmit the third signal to the second adapter;

the processing component comprising one or more processors, data storage, one or more first serial communications inputs, and one or more second serial communications outputs, wherein the processing component is configured to:

receive the second signal from the second multiplexer at the one or more first serial communications inputs;

extract the initial data from the second signal;

determine one or more modifications of the initial data based at least in part on the initial data;

generate modified data based at least in part on the one or more modifications;

generate the third signal comprising the modified data; and transmit the third signal via the one or more second serial communications outputs to the second multiplexer; and the second adapter comprising one or more second connectors and one or more second serial communications inputs, wherein the first adapter is configured to:

receive the third signal comprising the modified data from the second multiplexer at the one or more second serial communications inputs;

receive the second signal comprising the initial data from the first multiplexer at the one or more second serial communications inputs; and transmit a fourth signal via the one or more second connectors to the destination device; wherein:

the modified data comprises the initial data; and the processing component is configured to generate the modified data by augmenting the initial data with additional data comprising one or more of a coupon and a quick response (QR) code.

14. A data transmission system configured to modify data transmitted from a source device to a destination device, the data transmission system comprising:

a first adapter comprising one or more first connectors and one or more first serial communications outputs, wherein the first adapter is configured to:

receive a first signal comprising initial data from the source device at the one or more first connectors; and transmit a second signal comprising the initial data via the one or more serial communications outputs to a first multiplexer;

the first multiplexer configured to:

receive the second signal from the first adapter;

determine to transmit the second signal to one of a second multiplexer and a second adapter;

at least partially in response to determining to transmit the second signal to the second multiplexer, transmit the second signal to the second multiplexer; and at least partially in response to determining to transmit the second signal to the second adapter, transmit the second signal to the second adapter;

the second multiplexer configured to:

receive the second signal from the first multiplexer;

transmit the second signal to a processing component;

receive a third signal from the processing component; and transmit the third signal to the second adapter;

the processing component comprising one or more processors, data storage, one or more first serial communications inputs, and one or more second serial communications outputs, wherein the processing component is configured to:

receive the second signal from the second multiplexer at the one or more first serial communications inputs;

extract the initial data from the second signal;

determine one or more modifications of the initial data based at least in part on the initial data;

generate modified data based at least in part on the one or more modifications;

generate the third signal comprising the modified data; and transmit the third signal via the one or more second serial communications outputs to the second multiplexer; and the second adapter comprising one or more second connectors and one or more second serial communications inputs, wherein the first adapter is configured to:
receive the third signal comprising the modified data from the second multiplexer at the one or more second serial communications inputs;
receive the second signal comprising the initial data from the first multiplexer at the one or more second serial communications inputs; and
transmit a fourth signal via the one or more second connectors to the destination device, wherein the processing component further comprises one or more wireless communications components.

15. The data transmission system of claim 14, wherein the processing component is configured to determine the one or more modifications of the initial data based at least in part on the initial data by:
transmitting, via the one or more wireless communications components, at least a subset of the initial data to a remote system;
receiving, via the one or more wireless communications components, responsive data from the remote system; and
determining the one or more modifications of the initial data based at least in part on the responsive data.

16. A data transmission system configured to modify data transmitted from a source device to a destination device, the data transmission system comprising:
a first adapter comprising one or more first connectors and one or more first serial communications outputs, wherein the first adapter is configured to:
receive a first signal comprising initial data from the source device at the one or more first connectors; and
transmit a second signal comprising the initial data via the one or more serial communications outputs to a first multiplexer;
the first multiplexer configured to:
receive the second signal from the first adapter;
determine to transmit the second signal to one of a second multiplexer and a second adapter;
at least partially in response to determining to transmit the second signal to the second multiplexer, transmit the second signal to the second multiplexer; and
at least partially in response to determining to transmit the second signal to the second adapter, transmit the second signal to the second adapter;
the second multiplexer configured to:
receive the second signal from the first multiplexer;
transmit the second signal to a processing component;
receive a third signal from the processing component; and
transmit the third signal to the second adapter;
the processing component comprising one or more processors, data storage, one or more first serial communications inputs, and one or more second serial communications outputs, wherein the processing component is configured to:
receive the second signal from the second multiplexer at the one or more first serial communications inputs;
extract the initial data from the second signal;
determine one or more modifications of the initial data based at least in part on the initial data;
generate modified data based at least in part on the one or more modifications;
generate the third signal comprising the modified data; and
transmit the third signal via the one or more second serial communications outputs to the second multiplexer; and
the second adapter comprising one or more second connectors and one or more second serial communications inputs, wherein the first adapter is configured to:
receive the third signal comprising the modified data from the second multiplexer at the one or more second serial communications inputs;
receive the second signal comprising the initial data from the first multiplexer at the one or more second serial communications inputs; and
transmit a fourth signal via the one or more second connectors to the destination device,
wherein:
the one or more first connectors of the first adapter comprise a first single universal serial bus (USB) connector; and
the one or more second connectors of the second adapter comprise a second single USB connector.

17. A data transmission system of claim 15, A data transmission system configured to modify data transmitted from a source device to a destination device, the data transmission system comprising:
a first adapter comprising one or more first connectors and one or more first serial communications outputs, wherein the first adapter is configured to:
receive a first signal comprising initial data from the source device at the one or more first connectors; and
transmit a second signal comprising the initial data via the one or more serial communications outputs to a first multiplexer;
the first multiplexer configured to:
receive the second signal from the first adapter;
determine to transmit the second signal to one of a second multiplexer and a second adapter;
at least partially in response to determining to transmit the second signal to the second multiplexer, transmit the second signal to the second multiplexer; and
at least partially in response to determining to transmit the second signal to the second adapter, transmit the second signal to the second adapter;
the second multiplexer configured to:
receive the second signal from the first multiplexer;
transmit the second signal to a processing component;
receive a third signal from the processing component; and
transmit the third signal to the second adapter;
the processing component comprising one or more processors, data storage, one or more first serial communications inputs, and one or more second serial communications outputs, wherein the processing component is configured to:
receive the second signal from the second multiplexer at the one or more first serial communications inputs;
extract the initial data from the second signal;
determine one or more modifications of the initial data based at least in part on the initial data;
generate modified data based at least in part on the one or more modifications;
generate the third signal comprising the modified data; and
transmit the third signal via the one or more second serial communications outputs to the second multiplexer; and the second adapter comprising one or more second connectors and one or more second serial communications inputs, wherein the first adapter is configured to:
receive the third signal comprising the modified data from the second multiplexer at the one or more second serial communications inputs;
receive the second signal comprising the initial data from the first multiplexer at the one or more second serial communications inputs; and
transmit a fourth signal via the one or more second connectors to the destination device,
wherein:
the one or more first connectors of the first adapter comprise a first single serial communications connector that is not a universal serial bus (USB) connector; and
the one or more second connectors of the second adapter comprise a second single serial communications connector that is not a USB connector.

18. A data transmission system configured to modify data transmitted from a source device to a destination device, the data transmission system comprising:
a first adapter comprising one or more first connectors and one or more first serial communications outputs, wherein the first adapter is configured to:
receive a first signal comprising initial data from the source device at the one or more first connectors; and
transmit a second signal comprising the initial data via the one or more serial communications outputs to a first multiplexer;
the first multiplexer configured to:
receive the second signal from the first adapter;
determine to transmit the second signal to one of a second multiplexer and a second adapter;
at least partially in response to determining to transmit the second signal to the second multiplexer, transmit the second signal to the second multiplexer; and
at least partially in response to determining to transmit the second signal to the second adapter, transmit the second signal to the second adapter;
the second multiplexer configured to:
receive the second signal from the first multiplexer;
transmit the second signal to a processing component;
receive a third signal from the processing component; and
transmit the third signal to the second adapter;
the processing component comprising one or more processors, data storage, one or more first serial communications inputs, and one or more second serial communications outputs, wherein the processing component is configured to:
receive the second signal from the second multiplexer at the one or more first serial communications inputs;
extract the initial data from the second signal;
determine one or more modifications of the initial data based at least in part on the initial data;
generate modified data based at least in part on the one or more modifications;
generate the third signal comprising the modified data; and
transmit the third signal via the one or more second serial communications outputs to the second multiplexer; and
the second adapter comprising one or more second connectors and one or more second serial communications inputs, wherein the first adapter is configured to:
receive the third signal comprising the modified data from the second multiplexer at the one or more second serial communications inputs;
receive the second signal comprising the initial data from the first multiplexer at the one or more second serial communications inputs; and
transmit a fourth signal via the one or more second connectors to the destination device;
wherein the first multiplexer and the second multiplexer are configured in a single multiplexer component.

* * * * *

UNITED STATES PATENT AND TRADEMARK OFFICE
CERTIFICATE OF CORRECTION

| | |
|---|---|
| PATENT NO. | : 11,321,261 B1 |
| APPLICATION NO. | : 17/313200 |
| DATED | : May 3, 2022 |
| INVENTOR(S) | : Tobias Schneider |

It is certified that error appears in the above-identified patent and that said Letters Patent is hereby corrected as shown below:

In the Claims

At Claim 17, Line 21, "17. A data transmission system of claim 15, A data" should read --17. A data--.

Signed and Sealed this
Seventh Day of February, 2023

Katherine Kelly Vidal
*Director of the United States Patent and Trademark Office*